[19] United States Patent
Sugahara et al.

[11] 4,117,104
[45] Sep. 26, 1978

[54] NOVEL LEAD MONOXIDE AND PROCESS FOR PREPARATION THEREOF

[75] Inventors: Yujiro Sugahara, Tokyo; Yoshibumi Noshi; Hiroyuki Naito, both of Tsuruoka; Mamoru Saito, Tsuruoka; Akira Takahashi, Tsuruoka; Hisashi Tuchida, Tsuruoka, all of Japan

[73] Assignee: Mizusawa Kagaku Kogyo Kabushiki Kaisha, Osaka, Japan

[21] Appl. No.: 793,379

[22] Filed: May 30, 1977

[30] Foreign Application Priority Data

May 13, 1976 [GB] United Kingdom ............... 19804/76

[51] Int. Cl.² ............................................. C01G 21/02
[52] U.S. Cl. .................................................... 423/619
[58] Field of Search ......................................... 423/619

[56] References Cited

U.S. PATENT DOCUMENTS

| 1,376,581 | 5/1921 | Reed et al. | 423/619 |
| 1,979,745 | 11/1934 | Ishimura | 423/619 |
| 2,132,423 | 10/1938 | Klinker | 423/619 |
| 3,450,496 | 6/1969 | Kwestroo et al. | 423/619 |
| 3,623,838 | 11/1971 | Kunz et al. | 423/619 |

FOREIGN PATENT DOCUMENTS

| 3,711,801 | 8/1962 | Japan | 423/619 |
| 25,009 of | 1896 | United Kingdom | 423/619 |
| 476,238 | 12/1937 | United Kingdom | 423/619 |
| 559,994 | 3/1944 | United Kingdom | 423/619 |
| 1,400,885 | 7/1975 | United Kingdom | 423/619 |

Primary Examiner—O. R. Vertiz
Assistant Examiner—Wayne A. Langel
Attorney, Agent, or Firm—Sherman & Shalloway

[57] ABSTRACT

A novel lead monoxide having a true density of 8.3 to 9.2 g/cc, a primary particle size not larger than 0.2 $\mu$, an infrared absorption peak at a wave number of 1400 to 1410 cm$^{-1}$ and a chromic anhydride reactivity of at least 94%.

This lead monoxide is of the ultrafine particulate form excellent in light resistance, hue stability and reactivity and is substantially free of metallic lead. Chrome yellow, tribasic lead sulfate, lead silicate, white lead and the like lead salts can be prepared from this lead monoxide without performing a particular washing operation or using a catalyst.

28 Claims, 13 Drawing Figures

NOVEL LEAD MONOXIDE AND PROCESS FOR PREPARATION THEREOF

This invention relates to novel lead (II) monoxide and a process for the preparation thereof. More particularly, the invention relates to novel lead (II) monoxide of a ultrafine particulate form excellent in various properties such as light resistance, hue stability and reactivity and to a process of preparing this novel lead (II) monoxide.

Lead monoxide (litharge) has heretofore been commercially manufactured mainly according to the powder method developed by Dr. Genzo Shimazu in 1925. This method comprises charging particles of metallic lead into a tube mill, blowing air into the tube and peeling from surfaces of metallic lead particles powdery lead suboxide (generally called lead powder and having a composition $PbO_x$ in which $x$ is a number of from 0.3 to 0.7) by friction and oxidation with oxygen in air, which is accompanied by generation of heat. The resulting lead suboxide powder is withdrawn from the tube mill together with air, and it is heated and oxidized in another reaction vessel to form red or yellow lead monoxide. This lead monoxide includes two modifications, namely yellow PbO of the rhombic system which is formed when the calcination temperature is relatively high, i.e., so-called massicot, and red PbO of the tetragonal system which is formed when the calcination temperature is relatively low, i.e., so-called litharge. It is said that the enantiotropic transformation temperature between the two phases is about 500° to about 550° C.

These known lead monoxides, however, are not sufficiently satisfactory in their properties and preparation methods.

Lead monoxide has been regarded as a substance valuable as a stabilizer for a vinyl chloride resin, a rust preventing agent, a pigment and a photoconductor, and at the present it is treated as a substance very valuable as a raw material for production of a lead glass, a glaze, a vinyl chloride resin stabilizer, a lubricant, chrome yellow, a storage battery, etc. Each of known lead monoxides is readily blackened under irradiation of ultraviolet rays and is readily discolored by friction. In short, the known lead monoxides are very unstable. Further, the particle sizes of the known lead monoxides are generally coarse and in the range of 3 to 7 $\mu$. Because of these defects, the known lead monoxides are not used directly as a vinyl chloride resin stabilizer, a rust preventing agent, a pigment and the like at the present.

Further, because of the above-mentioned preparation method, the known lead monoxides should inevitably contain 0.01 to 3% by weight of metallic lead. Accordingly, when they are applied to ceramic uses, metallic lead is gradually accumulated in a hearth of a melting furnace to damage the hearth and other parts of the melting furnace. Moreover, the known lead monoxides are poor in reactivity with various acids such as sulfuric acid, chromic acid and carbonic acid, and therefore, in preparing lead compounds excellent in the hue, such as tribasic lead sulfate, chrome yellow and white lead, from these known lead monoxides, use of an acetic acid catalyst is indispensable and such troublesome operations as washing of the product and recovery of water-soluble lead salts from waste water must be conducted.

For those skilled in the art who handle lead, it is important not to pollute the working environment and surrounding environment. If this requirement is not satisfied, it will not be permissible to continue manufacture of lead compounds. In the above-mentioned method of preparing powdery lead suboxide, exhaust gas containing lead dusts is formed, and at the step of calcination of lead suboxide for formation of lead monoxide, high temperature exhaust gas containing lead dusts is also formed. Unless these lead dust-containing exhaust gases are treated by using an expensive dust collector, it is impossible to solve the above problem of prevention of environmental pollution.

We have conducted extensive research with a view to developing a method of preparing lead monoxide without formation of lead dusts. We previously proposed a method of preparing granular lead monoxide by shaping powdery lead suboxide into granules and calcining the granules in air (see Japanese Patent Application Laid-Open Specification No. 96492/73). According to this method, generation of lead-containing dusts can be prevented at the step of oxidation of powdery lead suboxide to lead monoxide, but this method is still insufficient in that exhaust gas containing lead in a considerable amount is formed and the problem of formation of dusts at the step of preparing powdery lead suboxide is not completely solved.

Further, there is known a method comprising oxidizing granules of metallic lead in water in the presence of oxygen. For example, in B. S. Brcic et al, "Monatshefte für Chemie und Verwandte Teil anderer Wissenschaften", vol. 95 (1964), pages 248-256, there is proposed a method comprising adding granules of metallic lead having a particle size of 12 to 16 mm into water at a concentration of about 20.7 g/l and oxidizing them under agitation by blowing air or carbon dioxide gas-free air. This method is very unique in that oxygen dissolved in water is utilized for oxidation of metallic lead, and the method is advantageous in that lead monoxide can be prepared without generation of dusts. However, according to this method, the conversion of metallic lead to lead monoxide per unit time is very low and lead monoxide is obtained in the form of a slurry having a very low lead monoxide concentration. Therefore, from the industrial viewpoint, this method is still unsatisfactory.

We found that when granules of metallic lead are filled in a rotary mill together with a liquid medium and oxygen and the rotary mill is rotated under such conditions that at least parts of the granules of metallic lead wetted with the liquid medium are located in the gas phase above the liquid level and friction is caused among the granules of metallic lead through the liquid medium, a slurry containing ultrafine particles of lead monoxide can be obtained at such a high oxidation speed as not expected from the amount of oxygen dissolved in the liquid medium.

It was also found that the lead monoxide prepared according to the above method has physical and chemical properties conspicuously different from those of known lead monoxides and that this lead monoxide is a novel lead monoxide of the ultrafine particulate form which is excellent in such properties as light resistance, hue stability and reactivity.

We have now completed this invention based on these findings.

It is a primary object of this invention to provide a novel lead monoxide of the ultrafine particulate form excellent in such properties as light resistance, hue stability and reactivity and a process for the preparation thereof.

Another object of this invention is to provide a process for preparing lead monoxide in which lead monoxide can be prepared from granules of metallic lead and molecular oxygen in a liquid medium without formation of dusts at such a high conversion as not expected from the amount of oxygen dissolved in the liquid medium.

Still another object of this invention is to provide a novel lead monoxide excellent in hue, light resistance, stability, etc., from which chrome yellow, tribasic lead sulfate, lead silicate, white lead and the like lead salts can be prepared without performing a particular washing operation or using a catalyst, and a process for the preparation thereof.

A further object of this invention is to provide a novel process for preparing a lead monoxide of the ultrafine particulate form which is substantially free of metallic lead.

Other objects and advantages of this invention will be apparent from the following detailed description.

In accordance with one aspect of this invention, there is provided a novel lead monoxide having a true density of 8.3 to 9.2 g/cc, a primary particle size not larger than 0.2 $\mu$, an infrared absorption peak at a wave number of 1400 to 1410 $cm^{-1}$ and a chromic anhydride reactivity of at least 94%.

In accordance with another aspect of this invention, there is provided a process for the preparation of lead monoxide which comprises charging granules of metallic lead, a liquid medium and oxygen in a rotary mill, rotating the rotary mill under such conditions that at least parts of the metallic lead granules wetted with the liquid medium are located in the gas phase above the level of the liquid medium and friction is caused among the metallic granules through the liquid medium, to thereby form a dispersion of very fine particles of lead monoxide in the liquid medium, separating the dispersion from the metallic lead granules, and if desired, recovering the thus formed lead monoxide in the form of a fine powder from said dispersion.

This invention will now be described in detail by reference to the accompanying drawings, in which.

PREPARATION PROCESS

In order to obtain lead monoxide of the fine particulate form having the above-mentioned novel properties at a very high conversion and a very high selectivity, in the process of this invention, it is important to form a dispersion of very fine particles of lead monoxide by charging granules of metallic lead, a liquid medium and oxygen into a rotary mill and rotating the rotary mill under such conditions that at least parts of the granules of metallic lead wetted with the liquid medium are located in the gas phase above the level of the liquid medium and friction is caused among the granules of metallic lead.

In the instant specification, the conversion is a value expressed by the following formula:

$$\text{Conversion (\%)} = \frac{\text{amount of metallic lead consumed for reaction}}{\text{amount charged of metallic lead}} \times 100 \quad (1)$$

The selectivity is a value expressed by the following formula:

$$\text{Selectivity (\%)} = \frac{\text{amount of lead monoxide in resulting slurry as calculated as metallic lead}}{\text{amount of metallic lead consumed for reaction}} \times 100 \quad (2)$$

Figure 1:
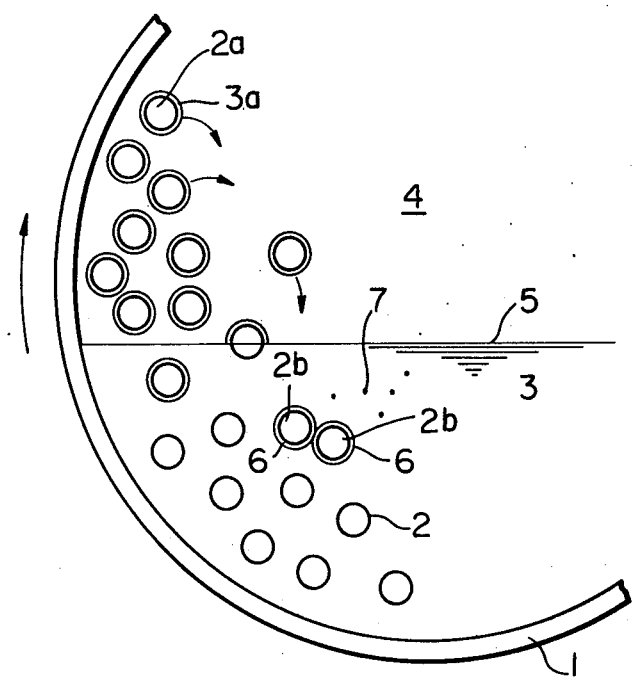
FIG. 1 is a diagram illustrating the principle of the process of this invention.

Referring now to FIG. 1 illustrating the principle of the preparation process of this invention, metallic lead granules 2, liquid medium 3 and oxygen gas 4 are charged in a rotary mill 1, and the rotary mill 1 is rotated in a prescribed direction indicated by an arrow, namely in the clockwise direction in FIG. 1. In this invention, the amounts charged of the respective substances and the peripheral rotation speed of the rotary mill 1 are controlled so that parts 2a of metallic granules having the surface wetted with the liquid medium are exposed into the gas phase 4 above the liquid level 5 and friction is caused among the metallic lead granules 2 through the liquid medium 3.

It is believed that the following mechanism is closely associated with the feature that according to the above process of this invention novel lead monoxide of the very fine particulate form can be obtained at such a high conversion as not expected from the amount of oxygen dissolved in the liquid medium, though not limited by this mechanism.

(1) At first, with rotation of the rotary mill 1 the metallic lead granules 2 are raised along the circumferential wall of the mill 1 and become exposed to the gas phase 4 above the liquid level 5, and thin layers 3a of the liquid medium 3 are formed on the surfaces of the metallic lead granules 2a exposed to the gas phase 4. Oxygen gas 4 in the gas phase 4 is readily absorbed in the thin layers 3a of the liquid medium 3 and oxidizes promptly the surfaces of the metallic lead granules 2a to form very thin film layers 6 of lead monoxide on the surfaces of the metallic lead granules 2a.

(2) Metallic granules 2b having very thin layers 6 of lead monoxide formed on the surfaces thereof are rubbed with one another through the liquid medium 3 and lead monoxide in the form of the very thin film layer 6 is dispersed into the liquid medium 3 in the form of a very fine particle 7 by this friction. At this point, the liquid medium 3 has an action of inducting and dispersing selectively very fine particles of lead monoxide into the liquid medium 3 from the surfaces of the metallic lead granules with friction among the metallic lead granules.

(3) Since lead monoxide film layers 6 thus formed are perpetually removed from the metallic lead granules 2b by mutual friction of the granules through the liquid medium, the surfaces of the metallic lead granules are always kept in the fresh and highly active state.

(4) The unit steps (1) to (3) are repeated on the metallic lead granules 2 having fresh surfaces.

In other words, the reaction system of the process of this invention is characterized in that (1) absorption of oxygen through a so-called wetted wall and subsequent oxidation of surfaces of metallic lead granules and (2) mutual friction of metallic lead granules having oxide films formed on the surfaces thereof through the liquid medium are frequently repeated in a very short cycle.

It is believed that in the process for oxidizing metallic lead by utilizing oxygen dissolved in a liquid medium, the reaction velocity is controlled by the oxygen-absorbing speed of the liquid medium. This oxygen-absorbing speed U (g/hr) is represented by the following formula:

$$U = kA(P_1 - P_2) \qquad (3)$$

in which $P_1$ denotes the partial pressure (Kg/cm$^2$ absolute) of oxygen in the gas phase, $P_2$ denotes the partial pressure (Kg/cm$^2$) of oxygen in the surface of the liquid, A is a gas-liquid contact area (cm$^2$), and k is a theoretical absorption speed constant [g.hr$^{-1}$.(cm$^2$)$^{-1}$.(Kg/cm$^2$)$^{-1}$].

From the above formula (3), it will readily be understood that in order to increase the oxygen-absorbing speed, it may be effective to increase the gas-liquid contact area A, the theoretical absorption speed constant k and the driving force ($\Delta P = P_1 - P_2$).

In the above-mentioned reaction system of this invention, since the metallic lead granules 2a having the surfaces wetted with the liquid medium are perpetually exposed to the gas phase above the liquid level 5, it is believed that the gas-liquid contact area A is remarkably increased over the case where metallic lead granules are agitated below the liquid level and oxygen is blown into the liquid medium and that since the metallic lead granules and the liquid medium are agitated by rotation of the mill 1, increase of the gas-liquid contact area A is further enhanced. It is also believed that since the layer 3a formed on the surface of the metallic lead granule is very thin and the gas phase and wetted metallic lead granules are violently agitated, interfacial films participating in migration of substances on both the gas phase and liquid phase sides are made thinner, resulting in remarkable increase of the absorption speed constant k. Thus, the reasons why such a high oxidation speed as not expected from the amount of oxygen dissolved in the liquid medium can be attained according to the process of this invention will be apparent.

Another factor influencing the speed of oxidation of metallic lead is a surface condition of a metallic lead granule. More specifically, in the case where an oxide film is formed on the surface of granular metallic lead, the granules are rendered passive and the oxidation speed is remarkably reduced. In the process of this invention, however, it is possible to rub violently metallic lead granules having very thin oxide films by mutual friction through the liquid medium and lead monoxide formed can be dispersed and separated very promptly into the liquid medium to render the surfaces of the metallic lead granules fresh and active, whereby the speed of oxidation of metallic lead can be remarkably enhanced.

The feature of this invention that lead monoxide formed on the surface of the metallic lead granule in the form of a very thin film is dispersed into the liquid medium by mutual friction of the metallic lead granules results in great advantages as regards not only the conversion but also the selectivity. For example, if granular metallic lead is maintained in the surface-wetted state in an oxidizing atmosphere for a long time, as illustrated in Comparative Example 6 given hereinafter, the conversion is reduced and formation of lead oxides other than lead monoxide, such as minium ($Pb_3O_4$) and/or lead peroxide ($PbO_2$), is enhanced to reduce the selectivity to lead monoxide drastically. In this case, the hue of the resulting oxide product is very bad. According to this invention, as illustrated in Examples given hereinafter, the selectivity to lead monoxide is generally at least 95%, especially at least 97%, and the resulting lead monoxide is excellent in the hue and hue stability.

Furthermore, the feature of this invention that oxidation of metallic lead is performed through the liquid medium and mutual friction of metallic lead granules is conducted through the liquid medium produce the following additional advantages:

(a) Precise control of the oxidation speed is possible and the oxide film formed on the surface of granular metallic lead can be made very thin.

(b) The liquid medium has an action of uniformalizing the oxidation temperature in the entire system and the oxidation temperature can be controlled to a very low level with the aid of the above advantage (a).

(c) The liquid medium has a much higher activity of inducing and dispersing very fine particles of lead monoxide from the surfaces of the metallic lead granules than a gaseous medium.

(d) Lead monoxide formed in the form of a very thin film can be separated from the granular metallic lead and can be stored and accumulated in the system in the form of a suspension until the concentration is elevated to a remarkably high level.

In this invention, the solid-liquid ratio ($R_{SL}$) defined by the following formula:

$$R_{SL} = W/V_1 \qquad (4)$$

wherein $V_1$ is a volume (l) of the liquid medium in the rotary mill and W is an amount (Kg) of granular metallic lead in the rotary mill, is also an important factor for practising the process of this invention under the above conditions. The lower limit of the solid-liquid ratio is determined based on whether or not wet metallic lead granules can be effectively exposed to oxygen in the gas phase. If the solid-liquid ratio is lower than the lower limit, as shown in Table 2, S-11 and S-13, given hereinafter, the yield per unit time is drastically reduced. The upper limit of the above solid-liquid ratio is determined based on whether or not a wetted wall is effectively formed on granular metallic lead and effective friction can be accomplished among the granules in the liquid medium. When this solid-liquid ratio $R_{SL}$ exceeds beyond a certain critical value, as shown in Table 2, S-5, given hereinafter, the selectivity to lead monoxide is drastically reduced. In this invention, it is preferred that the above solid-liquid ratio $R_{SL}$ be adjusted within a range of from 1 to 100 Kg/l, especially from 1 to 50 Kg/l.

Further, the gas-liquid ratio ($R_{GL}$) defined by the following formula:

$$R_{GL} = V_2/V_1 \qquad (5)$$

in which $V_1$ is a volume (l) of the liquid medium in the rotary mill and $V_2$ is a volume (l) of the space of the gas phase oxygen,
is also an important factor. In this invention, it is generally preferred that this gas-liquid ratio ($R_{GL}$) be within a range of from 0.05 to 120, especially from 0.2 to 120. When the gas-liquid ratio ($R_{GL}$) is lower than 0.05, the gas-liquid contact area is reduced and as shown in Table 1, S-11, given hereinafter, the yield per unit time or conversion is considerably lowered. If this gas-liquid ratio ($R_{GL}$) is higher than 120, reduction of the selectivity is conspicuous.

In order to perform effectively mutual friction of metallic lead granules and attain a high agitation effect in the reaction system, it is preferred that the packed volume ratio $R_V$ defined by the following formula:

$$R_V = B/V_o \qquad (6)$$

in which B is a bulk volume of metallic lead granules packed in the rotary mill and $V_o$ is an inner volume of the rotary mill,
be within a range of from 0.05 to 0.4, especially from 0.06 to 0.3.

Still further, in order to manifest the above-mentioned activities (1) and (2) effectively, it is important to adjust the rotation speed of the rotary mill appropriately. More specifically, in this invention, it is preferred that the rotary mill be rotated at a rotation number corresponding to 20 to 150%, especially 25 to 125%, of the critical rotation number ($N_C$, rpm) defined by the following formula:

$$N_C = 42.27/\sqrt{D} \qquad (7)$$

in which D denotes an inner diameter (m) of the rotary mill.

When the rotary mill is rotated at a rotation number larger than 150% of the critical rotation number, as shown in Example 1, S-21 and S-22, the yield of lead monoxide, namely the conversion to lead monoxide, is rather reduced, and adoption of such a large rotation number is not preferred because of wasteful consumption of energy.

Incidentally, the above critical rotation number ($N_C$) is a value theoretically determined on granules having in contact with the inner wall face of the rotary mill. Accordingly, even when the rotation number is larger than this critical rotation number, granules which have separated from the inner wall face of the rotary mill are once lifted up and when the granules are set free from the influence of the centrifugal force, they are let to fall by the gravity. In fact, by the naked eye observation we confirmed that if the rotary mill is rotated at a rotation number within the above range, granules of metallic lead fall violently on the liquid level to cause bubbling in the liquid.

According to this invention, by charging metallic lead granules, a liquid medium and oxygen in a rotary mill so that the above specific quantitative relationships are established and rotating the rotary mill at a rotation number within the above range, the oxygen absorption speed constant [Ka, $g.hr^{-1}.l^{-1}.(Kg/cm^2)^{-1}$] defined by the following formula:

$$Ka = Uo/(P_1 \times Vo) \qquad (8)$$

in which Uo is an amount of oxygen consumed per unit time (g/hr) calculated from the amount of lead monoxide formed per unit time, Vo is an inner volume (l) of the rotary mill, and $P_1$ is a partial pressure (Kg/cm$^2$ absolute) of oxygen in the gas phase in the rotary mill, can be elevated to at least 0.05, especially at least 0.1. According to the above-mentioned method of Brcic et al in which oxidation of metallic lead is performed by agitating metallic lead granules in water by blowing oxygen in water, as illustrated in Comparative Example 1 given hereinafter, the oxygen absorption constant (Ka) is only $6.4 \times 10^{-3} g.hr^{-1}.l^{-1}.(Kg/cm^2)^{-1}$ at highest. In contrast, when metallic lead granules, a liquid medium and oxygen are charged in a rotary mill at specific quantitative ratios and the rotary mill is rotated at a specific rotation number according to this invention, an oxygen absorption constant (Ka) of at least 0.05 can be obtained, and when an ideal wetted wall is formed on surfaces of metallic lead granules (see Example 1, S-5), the oxygen absorption constant (Ka) of 0.452 can be obtained, which value is about 70 times as high as the value obtained according to the conventional method of Brcic et al (Comparative Example 1).

The form of metallic lead granules is not particularly critical in this invention, and any of spherical granules, elliptical granules, columnar granules, prismatic granules, cubic granules, granules of other polyhedral forms, granules of rod-like forms, granules of gravel-like forms and amorphous granules can be used in this invention. However, in order to perform mutual friction of the granules effectively in the liquid medium, it is preferred that granules having a large volume per unit surface area, namely a heavy weight, such as spherical and elliptical granules, be used. It has been found that in this invention, even when the form of the granular metallic lead charged is indefinite to some extent, if rotation is continued in the rotary mill, the form of the granules is changed to a substantially spherical form by the plasticity of lead. The average size of the granular metallic lead to be charged to the reaction system can be changed within a range of 0.5 to 7 mm. In general, the conversion can be effectively improved when the size of the granules is reduced to increase the surface area per unit weight of lead charged. However, if the size of the granules is too small, a high friction effect is attained in the liquid medium and the granules become massive by cohesion, and therefore, it is impossible to form wetted walls on respective granules effectively. In this invention, it is preferred that the average size of the granular metallic lead be within a range of from 0.5 to 7 mm, especially from 1 to 5 mm. Granules of metallic lead can be prepared by known methods, for example, casting, extrusion, spraying, scattering and granulation in water.

In this invention, not only as-prepared granular metallic lead having a fresh outer surface but also granular metallic lead which has been allowed to stand still and which is rendered passive by a thin film of lead oxide, basic lead carbonate or the like formed on the outer surface thereof can be used in this invention. When ordinary lead monoxide is prepared, it is possible to use any of the above-mentioned two types of lead granules, but when it is intended to prepare lead monoxide of the hydrate type, it is preferred to use granular metallic lead having a fresh metal surface. Metallic lead granules which have been rendered passive can easily be converted to granules having fresh metal surfaces by treatment with dilute acetic acid, nitric acid, hydrochloric acid or the like. In order to obtain lead monoxide excellent in the hue, it is preferred to use granules having fresh metal surfaces. It has been found that the fresh surface state can be kept for a long time if metallic lead granules having fresh metal surfaces are completely immersed in stagnant water.

In this invention, any of liquid media capable of dissolving oxygen therein and substantially inactive with metallic lead and formed lead monoxide can be used. For example, there can be used aqueous media, polar organic solvents, e.g., alcohols such as methanol, ethanol, butanol, glycerin, ethylene glycol, propylene glycol and diacetone alcohol, ethers such as diethyl ether, dioxane, tetrahydrofuran and cellosolves, ketones such as methylethyl ketone, acetone, hexanone and isophorone, esters such as ethyl acetate and amyl acetate, amides such as dimethylformamide and dimethylacetamide, sulfoxides such as dimethylsulfoxide and amines such as pyridine and dimethylaniline, and nonpolar organic solvents, e.g., benzene, toluene, xylene, tetralin, dipentene, isoparaffin, heptane, trichlene, perchlene, chloroform, methylene chloride and carbon tetrachloride.

In this invention, it is preferred to use polar solvents, especially water and aqueous media such as mixtures of water with water-miscible polar organic solvents such as mentioned above. Water is a stable liquid medium which is available at a cheapest cost and water is excellent in the property of dissolving oxygen therein. Further, water has a high activity of inducing and dispersing formed lead monoxide in the very fine particulate state, and when water is used as the liquid medium, a dispersion of lead monoxide formed can be recovered in a stable state and at a high lead monoxide concentration. Accordingly, use of water as the liquid medium is most preferred. Further, use of water produces an advantage that the temperature of the treatment system can be changed within a relatively broad range. It is desirable to use water singly as the liquid medium, but if desired, a water-miscible organic solvent such as an alcohol, an ether and a ketone can be used together with water in an amount of up to 50 parts by volume, especially up to 40 parts by volume, per 100 parts by volume of water.

In this invention, the reaction proceeds smoothly even in the absence of a catalyst. However, in order to adjust the conversion of metallic lead to lead monoxide per unit time or control the crystal form of the resulting lead monoxide, various catalysts may be added to the liquid medium. As the catalyst, there can be mentioned, for example, (1) acids, e.g., inorganic acids such as nitric acid and organic acids such as acetic acid, (2) alkaline agents, e.g., ammonia, alkali metal hydroxides such as sodium hydroxide, alkaline earth metal hydroxides, and organic bases such as amines, and (3) salts such as ammonium nitrate, ammonium acetate, quaternary ammonium salts and acid addition salts of amines, but catalysts that can be used in this invention are not limited to those recited above. The amount added of the catalyst is not particularly critical in this invention. In general, the catalyst may be present in the liquid medium in an amount of $5 \times 10^{-4}$ to 5 g/100 cc of the liquid medium, volume of especially 0.01 to 3 g/100 cc of the liquid medium.

When an acid catalyst such as formic acid, nitric acid or tartaric acid is used, if the catalyst concentration is high and/or the reaction temperature is low, particles having a particle size of 0.1 to 0.5 $\mu$ are formed in some case. Accordingly, when such acid catalyst is employed, it is preferred that the catalyst concentration be reduced and the reaction temperature be elevated.

Molecular oxygen alone or a mixture of molecular oxygen with an inert gas can be used for oxidizing metallic lead in this invention. As the inert gas, there can be mentioned, for example, nitrogen, helium and argon. In order to increase the solubility of oxygen in the liquid medium, it is preferred to use pure oxygen gas, but in this invention, better results are obtained when a gaseous mixture comprising 1 mole of oxygen and up to 10 moles, especially up to 5 moles, of an inert gas such as nitrogen is employed. Accordingly, in this invention, decarbonated air or a mixture of decarbonated air and oxygen can be used in this invention. The pressure of oxygen or an oxygen-containing gas that is used in this invention may be atmospheric, but it is generally preferred that the pressure of oxygen or the oxygen-containing gas be elevated to at least 0.2 Kg/cm$^2$(absolute), especially to 1 to 10 Kg/cm$^2$ (absolute). In order to enhance the speed of absorption of oxygen into the liquid medium, as will be apparent from the above formula (3), it is preferred to increase the partial pressure of oxygen in the gas phase.

In this invention, the temperature of the reaction system, especially the temperature of the liquid medium, is not particularly critical, so far as the temperature is higher than the melting point of the liquid medium used and lower than the boiling point thereof under the inner total pressure. Of course, oxidation reaction of metallic lead is an exothermic reaction. Accordingly, if the milling treatment is conducted batchwise for a long time, the temperature is gradually elevated. Preferred temperatures differ to some extent depending on the intended crystal form of lead monoxide, but in general, it is preferred that the temperature be maintained within a range of from −5° to 70° C. especially from 0° to 50° C. When the temperature of the liquid medium is relatively high, the theoretical oxygen absorption constant (k) tends to decrease, and the selectivity is often reduced and the hue of the resulting lead monoxide is degraded in some case. Accordingly, in practising the process of this invention, it is preferred that the reaction system be cooled directly or the liquid medium to be fed to the reaction system be cooled in advance.

In this invention, the oxidation may be conducted batchwise or in a continuous manner. For example, prescribed amounts of granular metallic lead, a liquid medium and oxygen or an oxygen-containing gas are charged into the above-mentioned rotary mill and the reaction can be conducted batchwise. In this case, oxygen or the oxygen-containing gas may be fed into the rotary mill intermittently or continuously. Alternately, prescribed amounts of granular metallic lead and the liquid medium are charged in the rotary mill, and then, oxygen or the oxygen-containing gas and the liquid medium are fed intermittently or continuously while a slurry containing ultrafine particles of lead monoxide is withdrawn intermittently or continuously. In this continuous method, the granules of metallic lead may be charged into the rotary mill intermittently or continuously.

The residence time of the liquid medium in the reaction system, the time for contact of the liquid medium with metallic lead granules under mutual friction through the liquid medium, is not particularly critical in this invention. In this invention, lead monoxide formed according to the above-mentioned mechanism is exfoliated and dispersed in the liquid medium in a short time, but when the contact time is too short, only a dispersion (slurry) having a very low lead monoxide concentration is formed. Accordingly, it is generally preferred that the contact time be adjusted to at least 0.5 minute, especially 1 to 20 minutes. Of course, even when the residence time of the liquid medium in the reaction system is lower than the above range, a concentrated dispersion can be obtained by recycling the dispersion of a low concentration recovered from the reaction system, to the reaction system directly or after it has been cooled. If lead monoxide formed is made resident in the reaction system for too long a time, the hue of the product is degraded or the selectivity is reduced. Accordingly, in this invention it is not preferred to make formed lead monoxide resident in the reaction system for too long a time.

In view of the operation facility, it is preferred that the concentration of lead monoxide in the slurry to be recovered from the reaction system be 0.1 to 35 g/100 cc, especially 0.3 to 20 g/100 cc. It is one of significant advantages of this invention that a slurry of lead monoxide having such a high concentration can be recovered.

Accordingly, ultrafine particles of lead monoxide are exfoliated and dispersed in the liquid medium and a dispersion of these ultrafine particles is formed. Separation of this lead monoxide dispersion from the metallic lead granules can be accomplished very easily only by withdrawing the dispersion from the reaction system. It is another advantage of this invention that separation can be accomplished without particularly adopting any solid-liquid separation operation, for example, filtration, centrifugal separation, decantation or spray drying. Furthermore, it is very advantageous that the thus recovered dispersion or slurry is substantially free of metallic lead or other impurities. Of course, in the case where the size of metallic lead granules is drastically reduced, incorporation of ultrafine particles of metallic lead into the recovered lead monoxide dispersion can be completely prevented by passing the dispersion through a separator such as a liquid cyclone.

The separated dispersion or slurry may be used as a raw material for production of various lead salts as it is, but if desired, ultrafine particles of lead monoxide can be separated in the form of powder from the slurry. For example, the lead monoxide is first recovered in the form of a cake by sedimentation, centrifugal separation, decantation, filtration, electrophoresis, spray drying or the like and a final powdery product can be obtained by drying this cake.

Addition of an acid, a base or a salt thereof to the dispersion in effective for accelerating flocculation and sedimentation of ultrafine particles of lead monoxide.

Characteristic Properties of Novel Lead Monoxide of This Invention

Lead monoxide of this invention can be clearly distinguished from known lead monoxides in the point that it has a true density of 8.3 to 9.2 g/cc, preferably 8.35 to 9.18 g/cc. For example, Gmerin's Handbuch teaches that known yellow PbO of the rhombic system has a density of 9.63 g/cc and known red PbO of the tetragonal system has a density of 9.34 g/cc. The values are almost in agreement with the results of our measurement of densities of known lead monoxides (see Table 1, H-4 and H-5 of Comparative Example 3). As will be apparent from Examples given hereinafter, the lead monoxide prepared according to this invention has a considerably lower true density than known lead monoxides. This suggests that in the lead monoxide of this invention the atomic distance between lead and oxygen atoms is larger than in known lead monoxides.

It is believed that the reason why the lead monoxide can have a density in such a broad range as of from 8.3 to 9.2 g/cc is that the density is changed depending on the crystal form or the mixing state of crystal forms.

In the instant specification, by the term "litharge type lead monoxide" is meant a lead monoxide having X-ray diffraction peaks substantially corresponding to the following X-ray diffraction pattern:

Table A

| Lattice Spacing d (A) | Relative Intensity (I/Io) |
|---|---|
| 5.03 | 7.2 |
| 3.11 | 100 |
| 2.81 | 38.6 |
| 2.51 | 20.5 |
| 1.98 | 29.8 |
| 1.67 | 25.5 |
| 1.55 | 10.0 |
| 1.54 | 14.2 |

Further, in the instant specification, by the expression "substantially corresponding" is meant the fact that each of values of the relative intensity of peaks of lead monoxide of this invention may be changed from the value given above within a range of ± 2%.

By the term "massicot type lead monoxide" used herein is meant a lead monoxide having X-ray diffraction peaks substantially corresponding to the following X-ray diffraction pattern:

Table B

| Lattice Spacing d (A) | Relative Intensity (I/Io) |
|---|---|
| 3.07 | 30.5 |
| 2.95 | 100 |
| 2.74 | 7.4 |
| 2.38 | 5.2 |

By the term "hydrate type lead monoxide" used herein is meant a lead monoxide having X-ray diffraction peaks substantially corresponding to the following X-ray diffraction pattern:

Table C

| Lattice Spacing d (A) | Relative Intensity (I/Io) |
|---|---|
| 3.62 | 100 |
| 3.38 | 34.6 |
| 3.14 | 11.6 |
| 3.05 | 74.3 |
| 2.95 | 11.6 |
| 2.91 | 17.1 |
| 2.86 | 75.6 |
| 2.55 | 34.9 |
| 2.46 | 21.1 |
| 2.33 | 20.4 | or a composition composed mainly of this lead monoxide and containing a small amount of the litharge type lead monoxide and/or the massicot type lead monoxide.

Lead monoxide of the above-mentioned litharge type crystal structure has a density of 8.80 to 9.17 g/cc, lead monoxide of the massicot type crystal structure has a density of 8.35 to 9.2 g/cc, and lead monoxide of the hydrate type crystal structure has a density of 8.80 to 9.1 g/cc.

Figure 2:
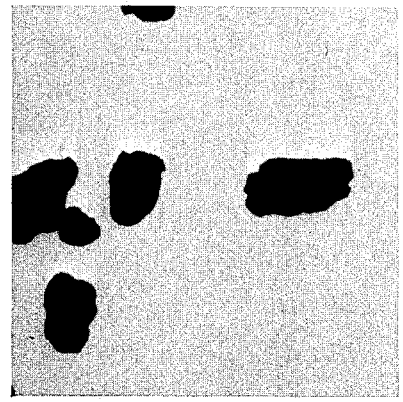
FIG. 2 is an electron microscope photograph ($\times$ 3,000) of known PbO of the rhombic system.
Figure 3:
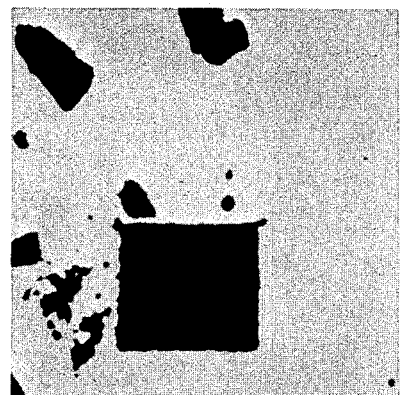
FIG. 3 is an electron microscope photograph ($\times$ 3,000) of known PbO of the tetragonal system.
Figure 4:
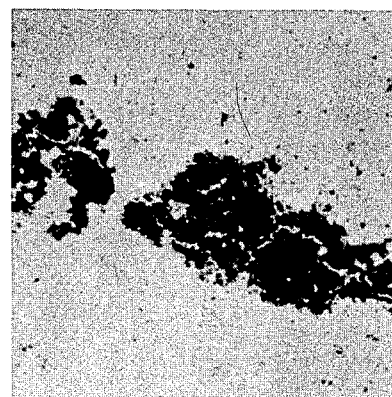
FIG. 4 is an electron microscope photograph ($\times$ 3,000) of litharge type lead monoxide of this invention.
Figure 5:
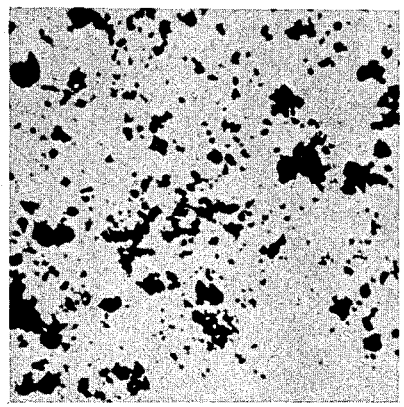
FIG. 5 is an electron microscope photograph ($\times$ 3,000) of massicot type lead monoxide of this invention.
Figure 6:
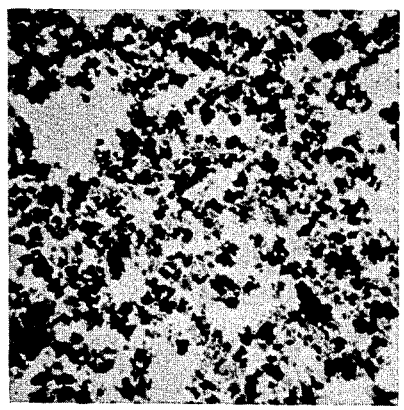
FIG. 6 is an electron microscope photograph ($\times$ 3,000) of hydrate type lead monoxide of this invention.

Lead monoxide of this invention generally has a primary particle size not larger than 0.2 μ, especially not larger than 0.1 μ. From FIG. 2 which is an electron microscope photograph of known yellow PbO of the rhombic system, it is seen that the primary particles size of this known lead monoxide is in the range of from 2 to 5 μ. Further, from FIG. 3 which is an electron microscopic photograph of known red lead monoxide of the tetragonal system, it is seen that the primary particle size of this known lead monoxide is in the range of from 3 to 5 μ. In contrast, lead monoxide of this invention has a much finer primary particle size. More specifically, as will be apparent from FIG. 4 which is an electron microscope photograph of an instance of lead monoxide of this invention (litharge type lead monoxide of S-19 of Example 1 given hereinafter), FIG. 5 which is an electron microscope photograph of another instance of lead monoxide of this invention (massicot type lead monoxide of S-6 of Example 1 given hereinafter) and FIG. 6 which is an electron microscope photograph of still another instance of lead monoxide of this invention (hydrate type lead monoxide of S-28 of Example 2 given hereinafter), the primary particle size of litharge type lead monoxide of this invention is 0.01 to 0.05 μ, that of massicot type lead monoxide of this invention is 0.01 to 0.05 μ, and that of hydrate type lead monoxide of this invention is also 0.01 to 0.05 μ.

Figure 7:
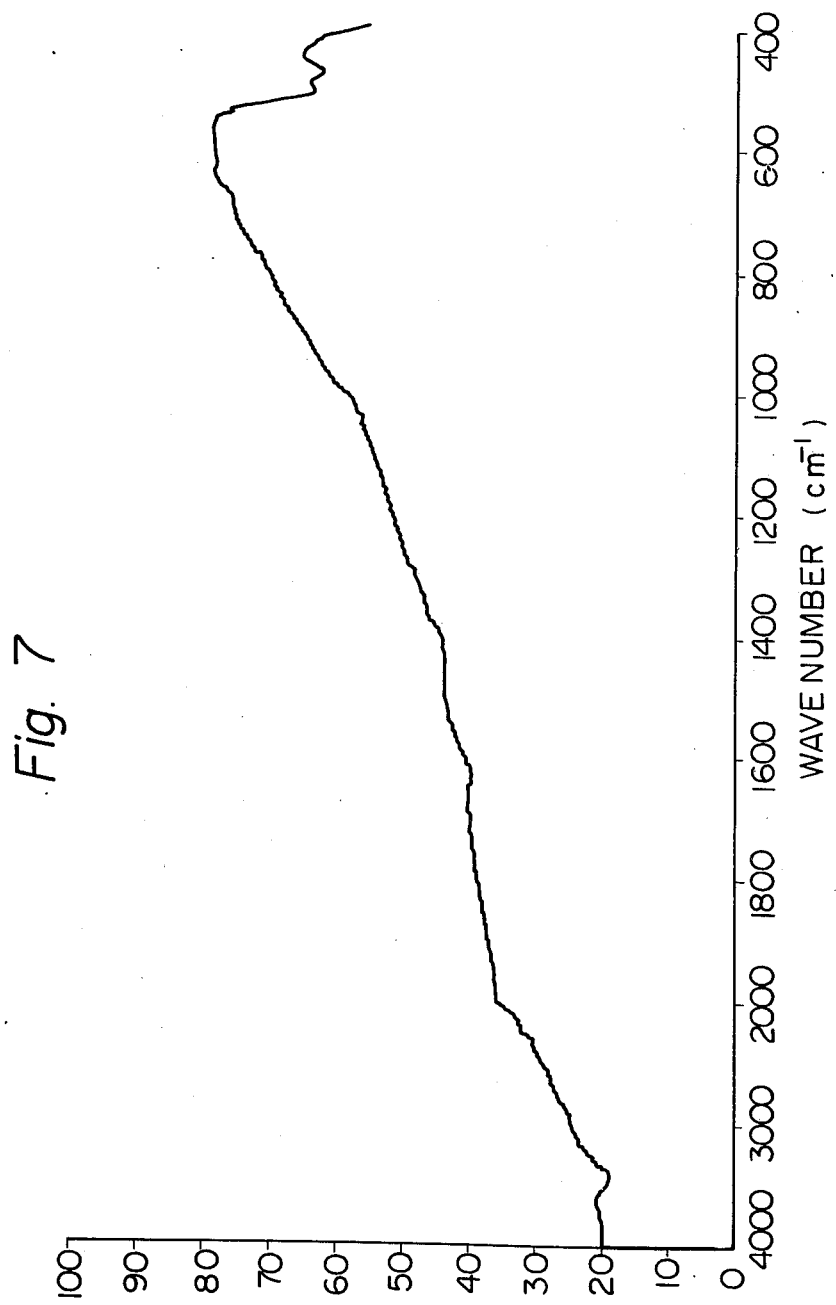
FIG. 7 is an IR absorption spectrum of known yellow PbO of the rhombic system.
Figure 8:
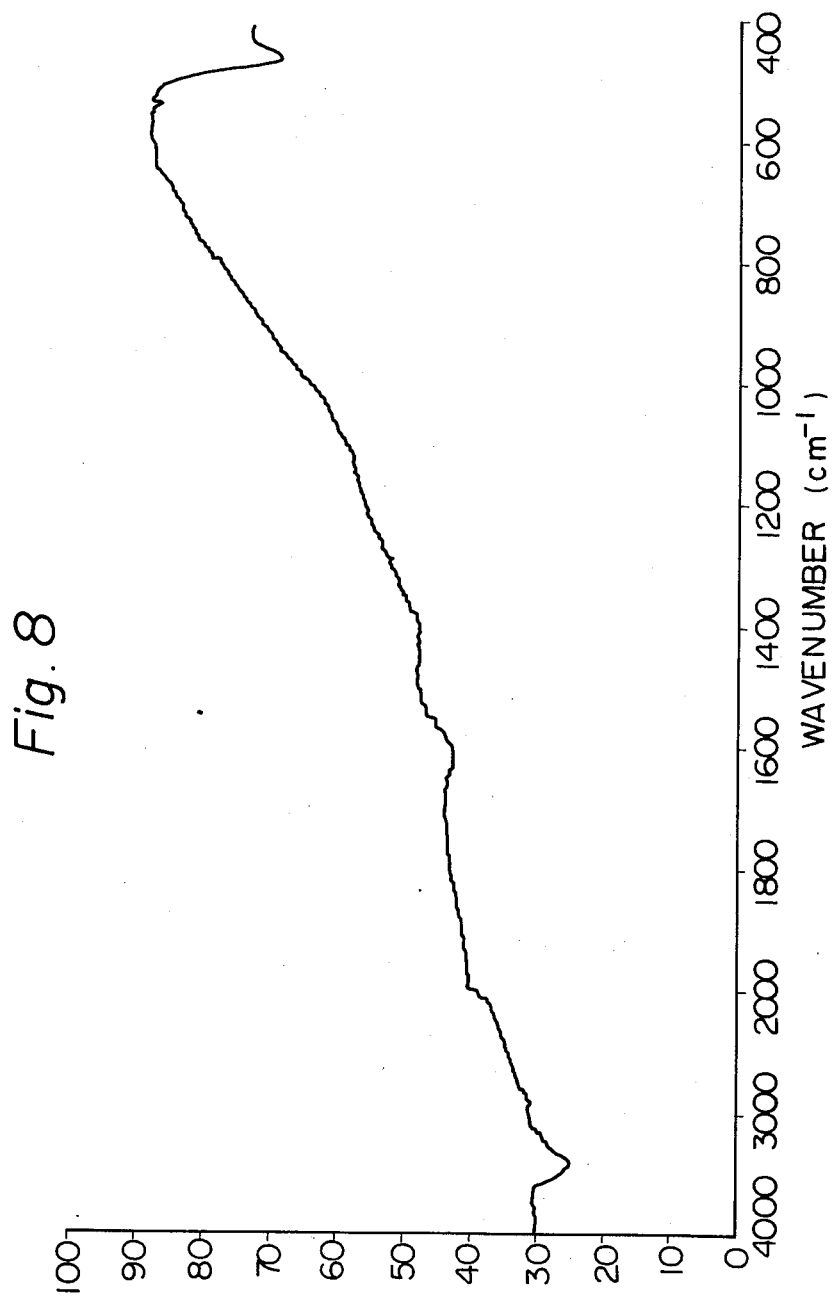
FIG. 8 is an IR absorption spectrum of known red PbO of the tetragonal system.
Figure 9:
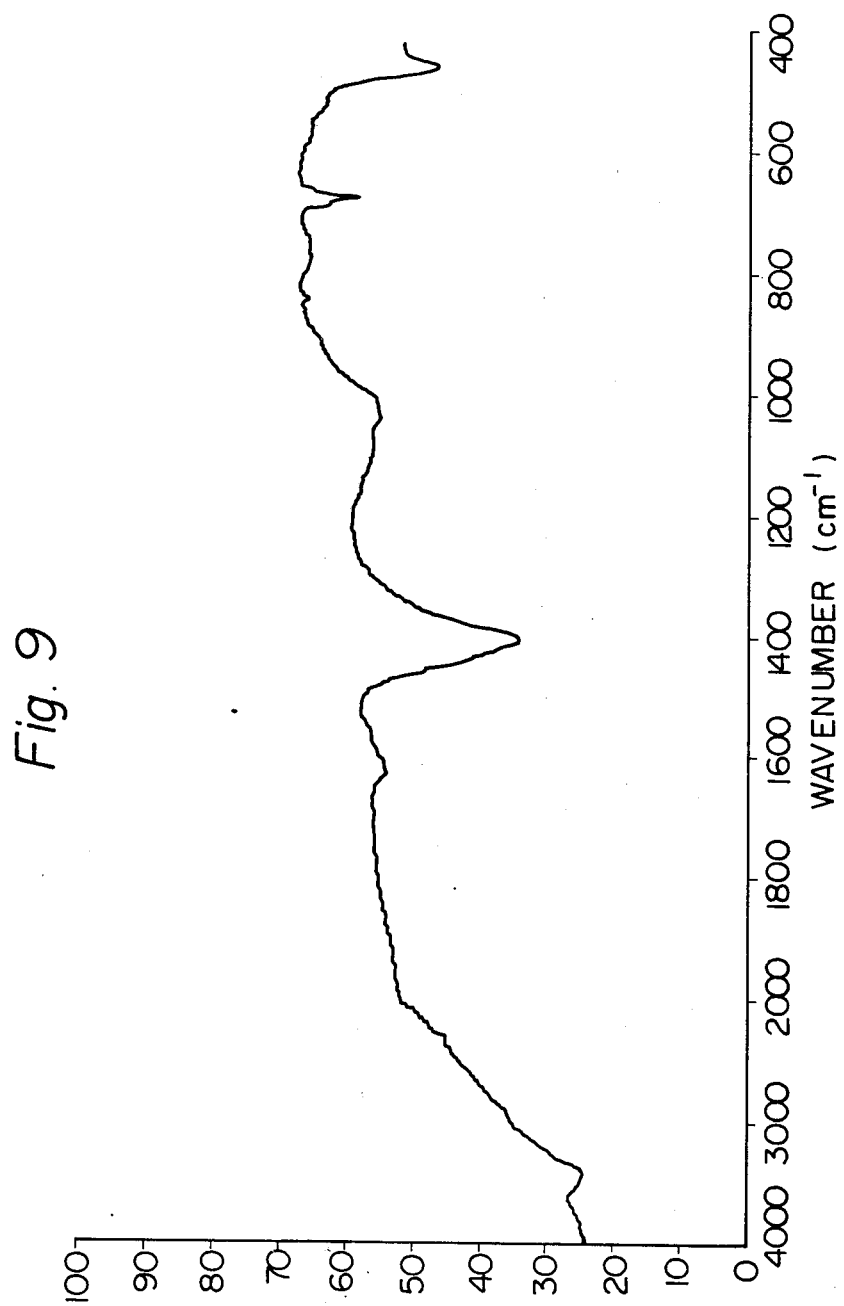
FIG. 9 is an IR absorption spectrum of litharge type lead monoxide of this invention.
Figure 10:
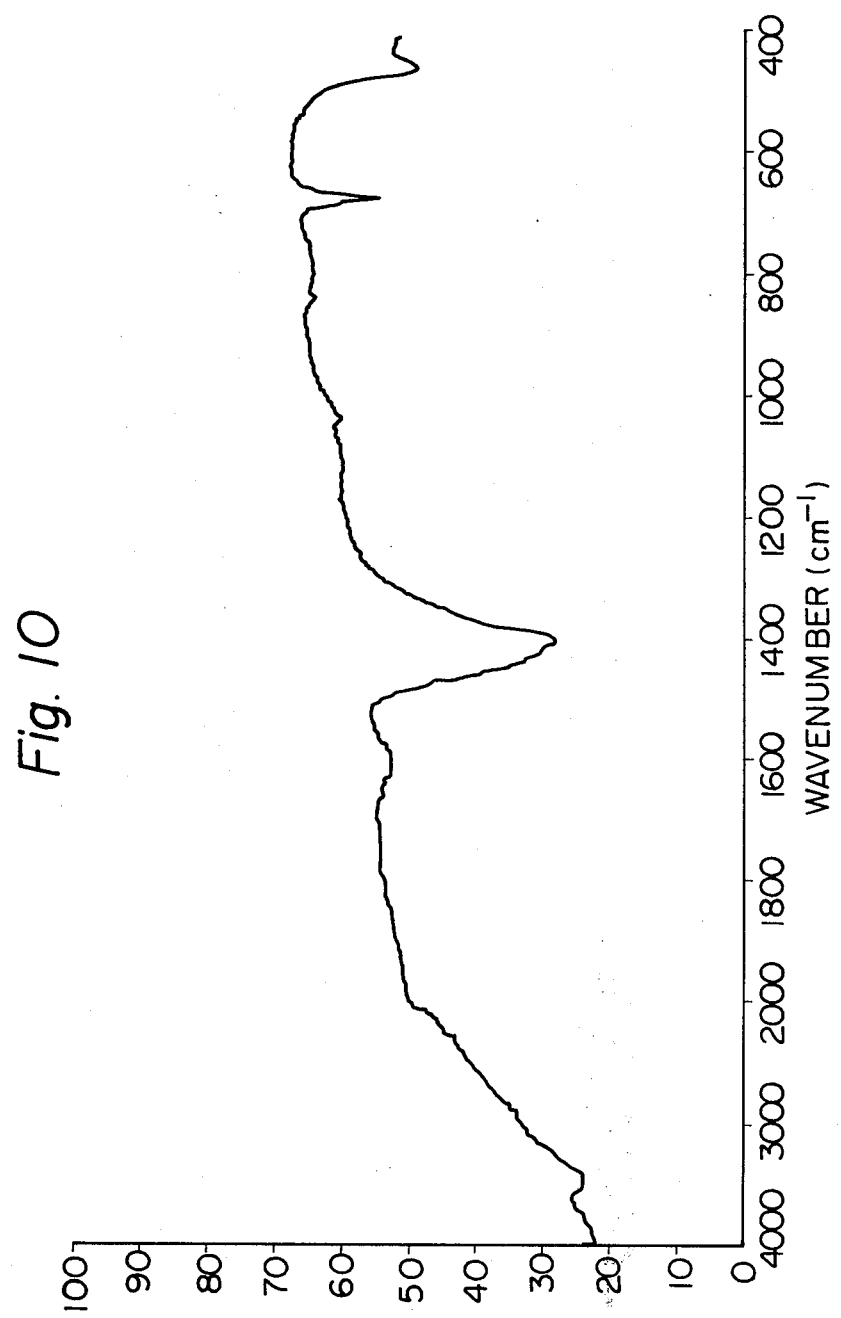
FIG. 10 is an IR absorption spectrum of massicot type lead monoxide of this invention.
Figure 11:
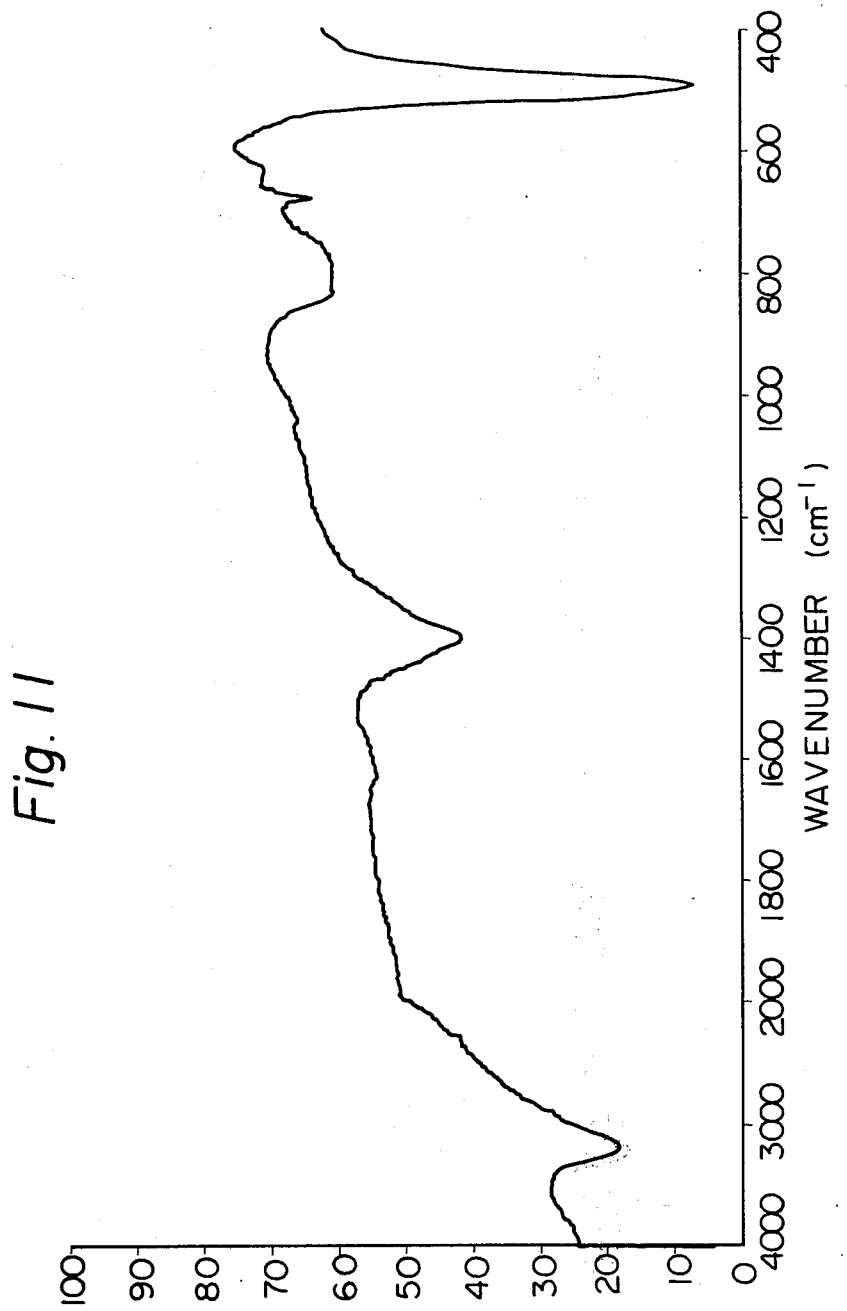
FIG. 11 is an IR absorption spectrum of hydrate type lead monoxide of this invention.
Figure 13:
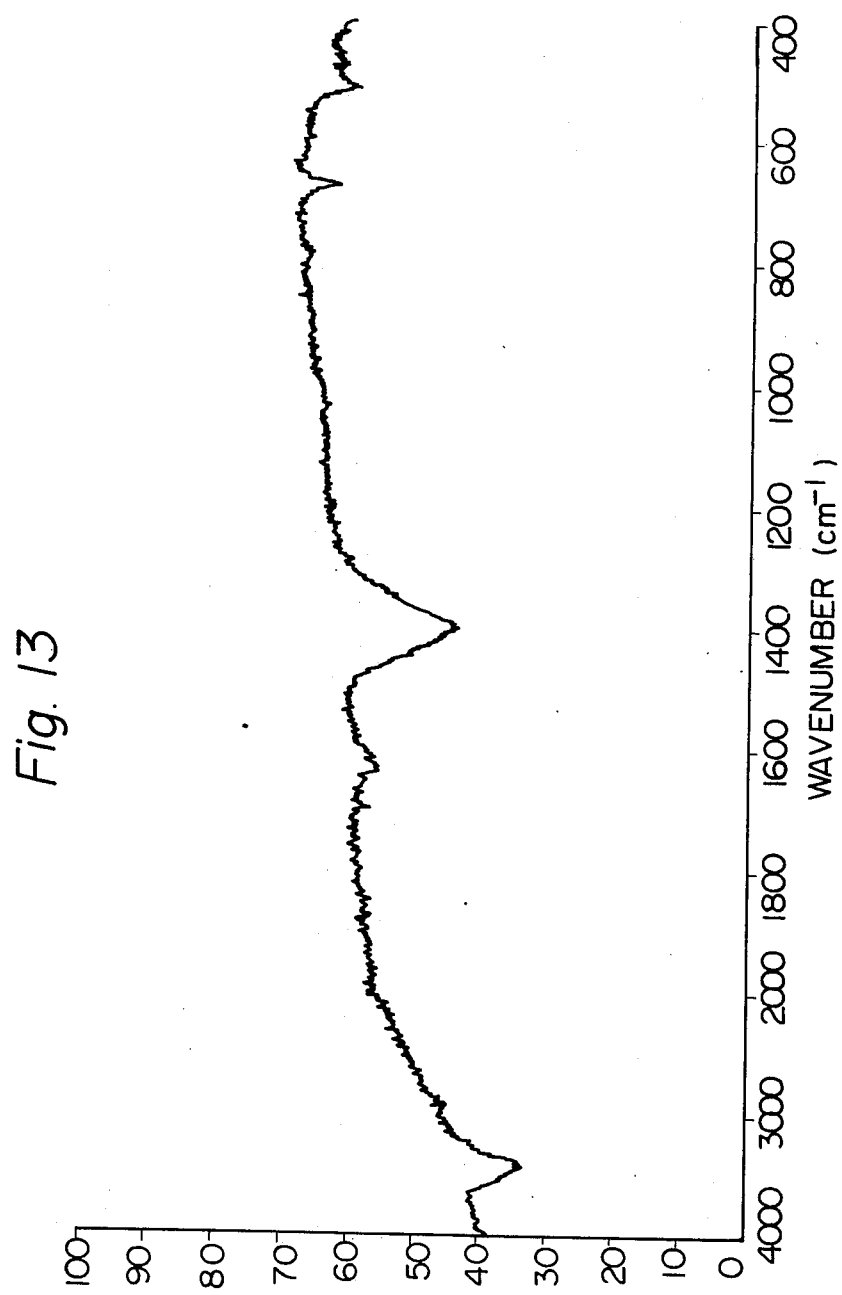
FIG. 13 is an IR absorption spectrum of the product obtained in Comparative Example 1, H-1.

The novel lead monoxide of this invention is further characterized in that it has an infrared (IR) absorption peak at a wave number of 1400 to 1410 cm$^{-1}$. As will be apparent from FIG. 7 illustrating the IR absorption spectrum of known yellow PbO of the rhombic system and FIG. 8 illustrating the IR absorption spectrum of known red PbO of the tetragonal system, any of the known lead monoxides has not substantially an absorption peak at a wave number of 1400 to 1410 cm$^{-1}$. In contrast, as will be apparent from FIG. 9 illustrating the IR absorption spectrum of litharge type lead monoxide of this invention (S-19 of Example 1), FIG. 10 illustrating the IR absorption spectrum of massicot type lead monoxide of this invention (S-6 of Example 1) and FIG. 11 illustrating the IR absorption spectrum of hydrate type lead monoxide of this invention (S-28 of Example 2), each type of lead monoxides of this invention has a prominent peak at a wave number of 1400 to 1410 cm$^{-1}$. Further, from comparison of FIGS. 7 and 8 with FIGS. 9 to 11, it will also be apparent that lead monoxide of this invention has a sharp absorption at a wave number of about 680 cm$^{-1}$, which is another characteristic of lead monoxide of this invention.

As a lead compound having IR absorption peaks at wave numbers of about 1400 cm$^{-1}$ and about 680 cm$^{-1}$, there is known so-called lead carbonate. However, lead monoxide of this invention is clearly distinguished from this lead carbonate. More specifically, each of lead monoxides mentioned above is one prepared in the reaction system from which carbon dioxide was completely excluded under such reaction conditions that no lead carbonate could be formed. Further, the lead monoxides of this invention are substantially free of IR absorption peaks inherent of lead carbonate, for example, peaks at wave numbers of 840, 1052 and 1732 cm$^{-1}$, and they have an IR absorption peak at a wave number of about 490 cm$^{-1}$, which is not observed at all in the IR absorption spectrum of lead carbonate. Accordingly, it can be said that the above-mentioned two absorption peaks are absorption peaks inherent of lead monoxide of this invention.

The lead monoxide of this invention can also be distinguished from known lead monoxides in the point that the lead monoxide of this invention has a chromic anhydride reactivity of at least 94%, preferably at least 96%. The term "chromic anhydride reactivity (RC)" used herein means a value defined by the following formula:

$$RC\,(\%) = AC/TC \times 100 \qquad (9)$$

wherein AC denotes the quantitative analysis value (g) of CrO$_3$ in a product (lead chromate) obtained by reacting lead monoxide with chromic anhydride at a molar ratio of 1:1 in water in the absence of a catalyst and TC denotes a theoretical value (g) of CrO$_3$ to be contained in the product, namely the amount of chromic anhydride added.

A higher value of the chromic anhydride reactivity indicates that reaction is performed more effectively.

Known lead monoxides generally have a chromic anhydride reactivity ranging from 40 to 80%, though the value varies to some extent according to the preparation method. Accordingly, they cannot be used for production of chrome yellow and the like if a catalyst is not used. In contrast, the lead monoxide of this invention has such a high chromic anhydride reactivity (RC) as cannot be expected from the values of known lead monoxides, for example, 99.9%.

The lead monoxide of this invention can take any of the above-mentioned litharge, massicot and hydrate type crystal forms according to the preparation conditions. The litharge type lead monoxide has a hue of a light yellow (light lemon) to orange color which varies depending on the preparation conditions. From the fact that orange litharge type lead monoxide produces a minute amount of dark turbidity when dissolved in acetic acid, it has been confirmed that it contains a minute amount of lead peroxide and/or minium. It has also been confirmed that light lemon litharge type lead monoxide is substantially free of lead peroxide or minium. The litharge type lead monoxide of this invention resembles known red PbO of the tetragonal system in the point that it has substantially the above-mentioned X-ray diffraction pattern shown in Table A. The litharge type lead monoxide of this invention can be clearly distinguished from this known PbO by the above-mentioned various characteristics, and it is different from the known PbO also in the point that the litharge type lead monoxide of this invention has a light yellow hue, whereas the known PbO has a sharp scarlet hue.

The massicot type lead monoxide of this invention having substantially the above-mentioned X-ray diffraction pattern shown in Table B generally has a yellow hue, and it is not particularly different from the known yellow PbO of the rhombic system with respect to the hue and the X-ray diffraction pattern, but it can be clearly distinguished from the known yellow PbO with respect to the above-mentioned various characteristics and the light resistance and hue stability described hereinafter.

From the fact that the hydrate type lead monoxide having substantially the above-mentioned X-ray diffraction pattern shown in Table C has a white hue and it is transformed into massicot type lead monoxide when dried completely, it has been identified as hydrous lead monoxide. In this invention, the content of hydrate water in the hydrate type lead monoxide is 0.2 to 0.8 mole, especially 0.3 to 0.5 mole, per mole of PbO.

Each of litharge, massicot and hydrate type lead monoxides of this invention is characterized by a remarkably excellent light resistance. Blackening is conspicuous when commercially available lead monoxide, namely yellow PbO of the rhombic system is irradiated with ultraviolet rays. More specifically, when known lead monoxide is irradiated with ultraviolet rays according to the light resistance test method described hereinafter, it is drastically blackened and the value of color difference ΔE is as high as 33 to 40. As will be apparent from Examples given hereinafter, each of the lead monoxides of this invention has a much reduced tendency of blackening when irradiated under the same conditions, and the value of color difference ΔE is generally lower than 30, especially lower than 20.

Blackening of lead monoxide under irradiation of ultraviolet rays is due to reduction of lead monoxide to metallic lead or lead suboxide having a degree of oxidation lower than that of lead monoxide. The fact that blackening under irradiation of ultraviolet rays is much reduced in the lead monoxide of this invention suggests that the bond between the lead atom and the oxygen atom is very stable. This is well in aggreement with the fact that the lead monoxide has a prominent characteristic absorption peak at a wave number of 1400 to 1410 $cm^{-1}$.

Still further, the lead monoxide of this invention is characterized in that the hue is very stable even under friction. For example, commercially available lead monoxide, namely yellow PbO of the rhombic system, has a characteristic property that it is readily reddened under friction. This will be apparent from the fact that so-called yellow or lemon litharge is readily reddened when it is rubbed with a nail. The reason why commercially available lead monoxide has an orange tint though it has a crystal form of the rhombic system is that transformation of PbO of the rhombic system to PbO of the tetragonal system is caused on surfaces of particles by pulverizing conditions in the preparation process. In contrast, in each of litharge, massicot and hydrate type lead monoxides of this invention, no substantial change of the hue is caused even under friction. This suggests that in the lead monoxide of this invention not only the bond between the lead atom and the oxygen atom but also the crystal per se is very stable.

Known PbO of the tetragonal system, for example, ultra-pure lead monoxide H-4 shown in Comparative Example 3 given hereinafter, has a remarkably sharp scarlet color just after preparation, but if only it is allowed to stand still at room temperature for 5 hours, its color is changed to a dark red color. In contrast, in each of litharge, massicot and hydrate type lead monoxides of this invention, no substantial change of the hue is caused even when it is allowed to stand still at room temperature for 30 days.

In this invention, since the above-mentioned peculiar preparation process is adopted, there is attained an advantage that the metallic lead content is remarkably reduced in novel lead monoxide products of this invention. Lead monoxide prepared from lead suboxide according to the so-called powder method has a metallic lead content of an order of 0.01 to 3% as expressed as the acetic acid-insoluble component content, and in lead monoxide prepared according to the above-mentioned granule oxidation method (U.S. Pat. No. 3,632,838: H-8 of Comparative Example 5 given hereinafter), the metallic lead content is of an order of 0.01% at lowest. In contrast, in the lead monoxide of this invention, the metallic lead content is so low that the presence of metallic lead can hardly be analytically confirmed.

Figure 12:
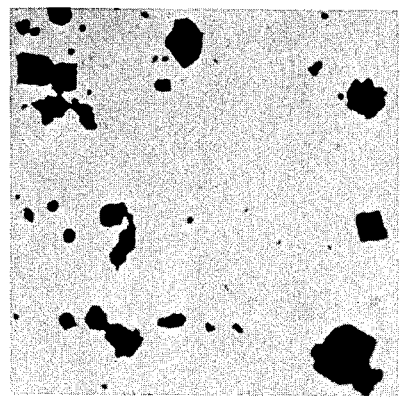
FIG. 12 is an electron microscope photograph ($\times$ 3,000) of the product obtained in Comparative Example 1, H-1.

The lead monoxide of this invention can be clearly distinguished from lead monoxide prepared according to the above-mentioned known method comprising agitating metallic lead granules in water in the presence of oxygen. As will be apparent from FIG. 12 which is an electron microscope photograph of lead monoxide prepared according to this known method, the primary particle size of this known lead monoxide is in the range of from 0.5 to 1 μ, which is quite different from the primary particle size of the lead monoxide of this invention. Moreover, this known lead monoxide is different from the lead monoxide of this invention with respect to the infrared absorption spectrum, chromic anhydride reactivity and other properties (see H-1 of Comparative Example 1 given hereinafter).

Litharge type lead monoxide of this invention can be prepared very easily under the above-mentioned reaction conditions. For example, it can readily be prepared under an oxygen pressure of 0.2 to 6 $Kg/cm^2$ (absolute) at a temperature of −5° to 60° C. for a residence time of 5 to 60 minutes in the absence or presence of a catalyst.

Massicot type lead monoxide of this invention can be prepared, for example, under an oxygen pressure of at least 1 $Kg/cm^2$ (absolute) in the presence of 0.001 to 8 g/cc, based on the liquid medium, or acetic acid as a catalyst by using water as the liquid medium.

Further, hydrate type lead monoxide of this invention can be prepared by using metallic lead granules having fresh metal surfaces, water as the liquid medium and acetic acid or ammonium nitrate as a catalyst and by adopting a relatively low reaction temperature, for example, −5° to 30° C.

Uses

The lead monoxide is excellent in the light resistance and hue stability and it has a form of a very fine particle. Further, it is characterized in that it is substantially free of metallic lead. By virtue of these characteristic properties, the lead monoxide of this invention can be effectively used as a vinyl chloride resin stabilizer, a rust preventing agent, a pigment, a photoconductor and the like. Further, because of the above-mentioned high reactivity, the lead monoxide of this invention can be used as a raw material for production of various lead salts, a raw material for ceramic industry, a raw material of a storage battery, etc.

This invention will now be described in more detail by reference to the following Examples and Comparative Examples that by no means limit the scope of the invention.

Prior to illustrating Examples of this invention, known methods for preparation of lead monoxide and properties of lead oxide products obtained according to these known methods are described so as to clarify the features of this invention.

Comparative Example 1

In this Comparative Example, a known method for preparing lead monoxide by agitating metallic lead granules in water while blowing air or oxygen into water is described. As the known method of this type, a method described in B. S. Brcic, M. Bulc, J. Siftar and A Urbanc, "Monatshefte fur Chemie and Verwandte Teil anderer Wissenschaften", vol. 95 (1964), pages 248–265 was adopted.

Metallic lead granules prepared according to the following method and classified to have a size of 1 to 6 mm were used as starting metallic lead granules.

As the starting lead there was used so-called electrolytic lead having the following composition (weight ratio):

| | | |
|---|---|---|
| Ag | | 0.0001/1,000,000 |
| Cu | | 0.0001/100 |
| Zn | | 0.0001/100 |
| Fe | | 0.0001/100 |
| Ni | | — |
| Sn | | 0.0005/100 |
| Bi | | 0.0006/100 |
| As | | 0.0001/100 |
| Pb | above | 99.99/100 |

An ingot (about 50 Kg per piece) of this starting lead was charged in a vessel composed of cast iron and molten at about 350° to about 400° C. Separately, a bowl-type iron vessel having 20 holes having a diameter of 1 to 2 mm perforated in the bottom thereof was attached to a vibrating machine so that electric vibrations were given to the iron vessel at a frequency of 3000 vibrations per minute, and the iron vessel was set at a point 30 cm above the liquid level of a receiving tank filled with water maintained at about 40° to about 70° C. The molten metal was poured in the perforated iron vessel. Vibrations were given to metallic lead streams coming from the holes of the vessel and the streams were cut while falling toward the liquid level. When the molten lead was let to fall into water, it was divided into spheres having a diameter of about 1 to about 6 mm and solidified in water to form spherical granules of metallic lead.

As the metallic lead oxidation apparatus, there was employed an apparatus comprising a main vessel of the columnar shape having a diameter of 18 cm and a height of 20 cm, a lid composed of stainless steel for covering the main vessel, a gas introduction pipe having a diameter of 7 mm and an exhaust gas discharge pipe having a diameter of 7 mm. The gas introduction pipe was designed so that a gas introduced was sufficiently dispersed into a deep portion of water filled in the main vessel. Especially, the top end of the pipe was arranged so that the gas was dispersed in water in a sufficiently divided fine state. The vessel was designed so that it could resist a pressure of at least 3 Kg/cm$^2$ gauge.

One liter of water was charged in this columnar stainless steel vessel and the vessel was set on a magnetic stirrer equipped with an agitation vane having a diameter of 8 mm and a length of 55 mm, and water was agitated at a rotation number of 3270 rpm. While the water temperature was maintained at 25° ± 0.5° C., 0.1 gram atom of the granular metallic lead (namely, 20.7 g) prepared according to the above method and having a particle size of 1 to 6 mm was charged. Air stored in a pressure bomb was passed through two gas-washing bottles filled with an aqueous solution of KOH to remove carbon dioxide gas, and then introduced into water at a rate of 2.5 1/60 minutes through the gas introduction pipe.

The reaction was continued for 24 hours under the above conditions while introducing air at the above rate. A thinly turbid light yellow dispersion containing lead oxides was recovered.

The lead monoxide thus formed was separated from the dispersion by a centrifugal separator and dried at 110° C. to obtain a whitish yellow lead monoxide powder (H-1).

Separately, oxidation reaction was carried out under pressure in the above oxidation apparatus by using oxygen.

More specifically, in the same manner as described above, 1 l of pure water was charged in the columnar stainless steel vessel. While water was being agitated by the agitation vane of the magnetic stirrer and the temperature of water was being maintained at 25° ± 0.5° C., 20.7 g of the granular metallic lead having an average size of 1 to 6 mm was charged and oxygen gas stored in an oxygen bomb was introduced from the introduction pipe. The reaction was carried out for 60 minutes while controlling the oxygen feed rate so that the inside pressure of the reaction vessel was 2 Kg/cm$^2$, to thereby obtain a whitish yellow lead monoxide-containing dispersion.

The lead monoxide was recovered from the dispersion by using a centrifugal separation and was dried at 110° C. to obtain a whitish yellow lead oxide powder (H-2).

The lead monoxides (H-1) and (H-2) prepared directly from metallic lead granules by conducting the reaction in water were tested with respect to the following items according to methods described below.

(A) Amount (g/hr) Formed of Lead Monoxide

From results of the analytical measurement of the amount (ml) of the dispersion recovered by 60 minutes' oxidation reaction and the concentration (g/100 ml) of lead monoxide (PbO), the amount (g) formed of lead monoxide (PbO) was directly determined.

The quantitative analysis of lead monoxide was carried out according to the method of JIS K-1456.

(B) Conversion (%)

In order to know amounts of lead compounds formed from metallic lead by oxidation for a unit time (60 minutes), the conversion (%) of metallic lead was determined. More specifically, from the amount (Kg) of the granular metallic lead charged and the amount (g) of the granular metallic lead consumed for the reaction, the conversion (%) was calculated according to the above formula (1).

(C) Selectivity (%) to Lead Monoxide

In order to compare the amount formed of lead monoxide with amounts formed of other lead compounds capable of being formed by the above reaction, such as minium (Pb$_3$O$_4$), lead carbonate (PbCO$_3$) and white lead [2PbCO$_3$.Pb(OH)$_2$], the selectivity to lead monoxide was determined. All the lead compounds contained in the recovered lead oxide dispersion were dissolved in a nitric acid-hydrogen peroxide solution, and amounts (as calculated as Pb) of minium and white lead were determined according to the method of JIS K-1457 [determination of minium (Pb$_3$O$_4$)] and the method of JIS K-5103 (determination of white lead) and these determined amounts were reduced from the total amounts of lead compounds in the recovered dispersion to determine the amount (as calculated as PbO) of lead monoxide. Then, the selectivity to lead monoxide was calculated according to the above formula (2).

(D) Average Particle Size

By using an electron microscope (Super-Scope Model JEM-50), sizes of 200 to 300 particles sampled on a collodion-carbon vacuum-deposited film according to the water paste method were measured at a magnification of 1000 to 3000 after 10-times enlargement of photographs to determine an average particle size ($\mu$).

(E) Content of Acetic Acid-Insoluble Component

According to the method of JIS K-1456 (determination of litharge), the amount of the acetic acid-insoluble component, namely metallic lead, was determined.

(F) Hues of Dispersion and Powder

Hues of the recovered dispersion and the resulting powder were examined with the naked eye.

(G) Chromic Anhydride Reactivity

A 2-liter beaker was charged with 500 ml of water, and 60.06 g, as solid component precisely weighed, of the lead monoxide dispersion was put into water under mild agitation and sufficiently dispersed in water. Then, the temperature of the dispersion was elevated to 65° C. Then, 100 ml of an aqueous solution of chromic anhydride (30.94 g/100 ml of water) was gradually added to the dispersion over a period of 30 minutes, and the mixture was aged at 65° C. for 60 minutes under agitation to thereby form crystals of lead chromate. The crystals of lead chromate were recovered by filtration through a filter paper No. 3, washed with water and dried at 110° C. The amount (g) of chromic anhydride ($CrO_3$) thus fixed as lead chromate was determined by the quantitative analysis. From the thus determined amount (g) of chromic anhydride fixed as lead chromate and the amount (g) of chromic anhydride used, the chromic anhydride reactivity (RC) was calculated according to the formula (9).

(H) Light Resistance

A sample (1 g) was placed on a glass sheet of an automatic Hoover muller and 0.6 ml of a vehicle (1:1 weight ratio mixture of castor oil and dioctyl phthalate) was added to the sample. The mixture was sufficiently kneaded by the muller to render it homogeneous. Then, the homogeneous mixture was placed to the glass sheet, and 3.7 g of a transparent clear lacquer was added and the mixture was sufficiently kneaded to form a homogeneous paste. The paste was coated in a uniform thickness on an art paper by using a film applicator having a clearance of 0.2032 mm and naturally dried to obtain a sheet for determination of the color difference.

The sheet was set at a position 36 cm distant from a high pressure mercury lamp for the fading test (Model H-400FT manufactured by Tokyo Shibaura Denki) and exposed to rays of the high pressure mercury lamp for 24 hours while the sheet was being rotated at 2 rpm.

The hues of the so irradiated sheet and the sheet which was not irradiated were measured by a color difference meter (Model ND-101D manufactured by Nippon Densyoku) and the color difference $\Delta E$ was determined according to the method of ASTM D1482-57T.

(I) Measurement of Infrared Absorption Spectrum:

The infrared absorption spectrum was automatically recorded in a wave length region of 4000 to 400 cm$^{-1}$ by using an infrared absorption spectrum measuring apparatus (Model IR-G manufactured by Nippon Bunko Kogyo) with respect to KBr tablets molded in vacuo (3 mm Hg) under a compression of 400 Kg/cm$^2$. The intensity of the absorption peak was evaluated according to the following scale:

*vs:* very strong
*s:* strong
*m:* mean
*w:* weak
*b:* broad
*sh:* shoulder (J) Measurement of X-Ray Diffraction Pattern The X-ray diffraction pattern was measured under the following conditions according to the powder method using an automatic recording X-ray diffraction apparatus (manufactured by Rigaku Denki; X-ray generator = Cat No. 2001; goniometer = Cat No. 2227 for broad angle range measurement; counter = proportional counter):

target: Cu
filter: Ni
voltage: 30 KV
current: 15 mA
count range: 1000 cps
high pressure voltage: 1450 V
time constant: 1 sec
chart speed: 1 cm/min
scanning speed: 1°/min
diffraction angle: 17°–60.5°
slit width: 1°-1°-0.3

The crystal form was classified as follows:
L: litharge type
M: massicot type
H: hydrate type
W: white lead
T: $3PbO.H_2O$ (K) Density A picnometer was filled with benzene and the weight (W) of benzene was measured. The temperature (Ti) was also measured by a thermometer equipped to the picnometer. Then, benzene was withdrawn from the picnometer, and a prescribed amount (M, g) of a sample was charged into the picnometer and benzene was added. The picnometer was placed in a reduced pressure desiccator, and a reduced pressure from of 3 mm Hg was maintained for 3 hours by using a vacuum pump. Then, the cock was closed and the vacuum pump was dismounted. Then, the picnometer was allowed to stand still at the temperature (Ti) overnight. The cock was opened and the picnometer was taken out. Benzene was added to fill the picnometer. The weight (W') and the temperature (Ti) were measured, and the density was calculated according to the following formula:

$$ds = \frac{M}{\frac{(M+W)-W'}{d}}$$

wherein ds denotes the density of the sample and $d$ denotes the specific gravity of benzene at the temperature, Ti.

(L) Heat Stability (Hydrogen Chloride-Catching Property)

50 parts by weight of dioctyl phthalate (manufactured by Kyowa Hakko) was added to 100 parts by weight of a vinyl chloride resin (VINYLCLON 4000M manufactured by Mitsui Toatu), and 5 parts of a sample was added to the mixture. The mixture was sufficiently blended, kneaded at 155° C. for 10 minutes by means of a kneading roll, and taken in the form of a sheet having a thickness of about 0.5 mm. Three of the so formed sheets were piled and pressed at 170° C. under a pressure of 200 Kg/cm$^2$ for 10 minutes to obtain a sheet having a thickness of about 1 mm. Then, the sheet was cut into pieces having a volume of about 0.5 mm$^3$, and 2 g of the so formed pieces were charged in a test tube having a diameter of 1.5 cm. A Congo Red test paper wetted with glycerin was fixed to the mouth of the test tube so that it did not touch the wall of the test tube.

The test tube was dipped in an oil bath maintained at 180° C. and the time required for bluing of the Congo Red test paper by hydrogen chloride formed as a result of the thermal decomposition of the vinyl chloride resin was measured. The heat stability (chlorine-catching property) was evaluated based on the above time (minutes). The longer the time (minutes) required for bluing, the higher the stabilizing effect against thermal decomposition.

(M) Hiding Power

According to the method of JIS K-5104 described above with respect to the measurement of the light resistance, a transparent clear lacquer-containing paste was prepared. The measurement was conducted by using a cryptometer and the hiding power was measured according to the following formula:

$$HP\ (cm^2/g) = \frac{W/d + V}{K \cdot L \times 0.1} \times \frac{1}{W}$$

in which W denotes the weight (g) of the sample, v denotes the amount (cc) of castor oil, d is a specific gravity of the sample, K is a constant of the cryptometer, and L denotes the distance (mm) at which the standard line becomes unseen.

(N) Rust Preventing Effect

A paint having the following composition was prepared by using a sand grinding mill:

| | |
|---|---|
| Alkyd resin | 100 parts by weight |
| Extender pigment | 50 parts by weight |
| Sample | 10 parts by weight |

The alkyd resin used was Bechosol P-470 (manufactured by Japan Reichhold Chemicals; solid content = 70%).

According to the salt resistance method of JIS K-5400-7.6 and the salt spray test method of JIS K-5400-7.8, the paint was coated on a mild steel plate, the coated plate was placed in a salt spray chamber maintained at 60° C., 3% salt solution was sprayed on the coated for 96 hours, and the state of the coated surface was examined and the rust preventing effect was evaluated according to the following scale:

A: No rust noted, there being practically no change since the time the test plate was painted.

B: Rusts on the order of pinholes are noted.

C: Rusting of part of the test plate, and cracks and bulges of parts of the film coating noted.

D: A major part of the test plate is rusted, and a major part of the film coating has peeled off.

E: Rupture of the film coating and rusting over the whole of the substrate has occurred.

(O) Hue Stability 5 g of a sample was charged in an Ishikawa type automatic mortar and pulverized for 1 minute at a rotation number of 60 rpm, and the change of the hue by pulverization was examined and the hue stability was evaluated based on the change of the hue according to the following scale:

O: good hue stability without change of hue
Δ: slight change of hue
X: drastical change of hue Results of the above experiments made on samples H-1 and H-2 prepared in this Comparative Example 1 are shown in Table 1.

Comparative Example 2

In this Comparative Example, known hydrate type lead monoxide and its preparation method are described.

Although a typical method of preparation of hydrate type lead monoxide is summarized in Gmerins Handbuch, Blei (1969), pages 119 – 122, in this Comparative Example hydrate type lead monoxide was prepared according to the method detailed in V. Kohlschutter, H. Doesti, Ber. Deut. Chem. Ges., 56 (1923), pages 275–288. More specifically, 20 ml of a 2-N aqueous solution of lead acetate was gradually added under agitation to 1 l of 11-N aqueous ammonia free of carbon dioxide gas and maintained at 15° C. to thereby form a crystalline white precipitate. The precipitate was separated, washed 5 times by decantation using pure water and recovered in the form of a white cake. The cake was allowed to stand still in a vacuum desiccator filled with a 30% aqueous solution of potassium hydroxide for 1 day, to obtain a white hydrate of lead monoxide (H-3).

The so obtained hydrate type lead monoxide was tested according to the methods described in Comparative Example 1 to obtain results shown in Table 1.

Comparative Example 3

Known ultra-pure lead monoxide and its preparation method are illustrated in this Comparative Example.

Ultra-pure lead monoxide was prepared according to the method disclosed in W. Kwestroo, A. Huizing, J. Inorg. Nucl. Chem., 27 (1965), pages 1951-1954. More specifically, 165 g of lead acetate [$Pb(CH_3COO)_2.3H_2O$] was charged in a 2-liter capacity polyethylene vessel, and 350 ml of pure water was added to form a solution. The solution was passed at a rate of 75 ml/min through a polyethylene column having an inner diameter of 3 cm and a length of 10 cm and packed with metallic lead granules (having a particle size of 10 to 100 $\mu$), and the resulting lead acetate solution from which such impurity elements as Si, Fe, Al, B, As, Mn and the like had been removed was placed in a polyethylene vessel. Then, 1650 ml of 10-N aqueous ammonia which had been carefully prepared so that such impurity elements as Si, Mg, Fe, Al, B, As, Mn and the like were not incorporated at all was poured into the above lead acetate solution at 25° C. under agitation by using a magnetic stirrer, to thereby form a bulky white precipitate. This precipitate was, however, converted in several minutes to a greenish crystalline precipitate. The precipitate was washed 5 times by decantation using purified 2N aqueous ammonia. Then, 200 ml of pure water was added to the precipitate and the mixture was maintained at 80° C. for 10 hours, whereby the greenish crystalline precipitate was converted to a greenish dark scarlet precipitate. The precipitate was washed 5 times with purified 2N aqueous ammonia and dried at 95° C. for 6 hours on a platinum saucer to obtain crystals of lead monoxide having a sharp scarlet color. The crystals were further dried at 150° C. for 6 hours to obtain a ultra-pure lead monoxide powder having a scarlet color (H-4).

The above procedures were repeated in the same manner as described above except that glass vessels were used instead of polyethylene vessels. In this case, a ultra-pure lead monoxide powder having a sharp yellow color (H-5) was obtained.

The so obtained scarlet lead monoxide (H-4) and yellow lead monoxide (H-5) were tested according to the methods described in Comparative Example 1 to obtain results shown in Table 1.

Comparative Example 4

A known dry method for preparation of lead monoxide is described in this Comparative Example.

As the known dry method for preparation of lead monoxide, there was adopted a method disclosed in Japanese Patent Publication No. 11801/62.

An ingot of the same electrolytic lead as used in Comparative Example 1 was molded into columns having a diameter of 2.5 cm and a length of 2.0 cm, and according to the Shimazu's lead powder method (see Journal of Japanese Association of Machinery, 28 (1925), No. 100, pages 489–516), the columns were pulverized in a rotary mill to obtain dark gray greenish powder of lead suboxide (so-called lead powder).

The so obtained lead suboxide powder was charged in a rotary furnace and calcined under agitation at about 600° to about 650° C. while introducing oxygen into the furnace to effect oxidation. The heat generated by oxidation of lead suboxide was measured, and at the point when no elevation of the temperature by oxidation was observed, the resulting granules were promptly transferred into a cooling chamber to effect cooling, whereby yellow granular lead monoxide was obtained. When the resulting yellow granular lead monoxide was pulverized, an orange powder of lead monoxide (H-6) was obtained.

The resulting lead monoxide (H-6) was further pulverized according to the following method [Ryoichi Kiriyama et al, "Pulverization", Zairyo (Materials), 19 (1970), No. 201, pages 587–591].

More specifically, an Ishikawa type porcelain automatic mortar (having an inner capacity of about 0.9 l) was used as the pulverizing apparatus. The mortar was set in a chamber and the inside atmosphere of the chamber was replaced by nitrogen gas so that the lead monoxide was not influenced by water, carbon dioxide gas and the like. The starting lead monoxide was sufficiently deaerated in vacuo in advance. These cares were taken because Kiriyama et al teach that the presence of such small amounts of air and carbon dioxide gas as contained in air will often convert lead monoxide to basic lead carbonate very easily.

The mortar set in the sealed chamber in which the atmosphere had been replaced by nitrogen gas was charged with 10 g of the lead monoxide powder (H-6) and the powder was pulverized for 50 hours by rotating a pestle at a rotation rate of 60 rpm to obtain finely pulverized lead monoxide having an orange color (H-7).

The so obtained lead monoxides (H-6) and (H-7) were tested according to the methods described in Comparative Example 1 to obtain results shown in Table 1.

Comparative Example 5

Lead monoxide prepared according to a known method comprising forming granules from lead suboxide powder in the presence of water and oxidizing the granules is described in this Comparative Example.

Dark grey greenish lead suboxide powder having an acetic acid-insoluble content of 26.2%, which was prepared according to the Shimazu lead powder method described in Comparative Example 4 was used as the starting lead suboxide powder.

From this lead suboxide powder was prepared lead monoxide according to the method of Wilhelm Kunz et al (U.S. Pat. No. 3,623,838). More specifically, 60 ml of water was added to 1 Kg of the above lead suboxide powder, and the mixture was kneaded to wet the powder uniformly with water. The mixture was then shaped into columns having a diameter of about 2 mm and a length of 2 to 4 mm by using a granulator and dried at about 110° to about 130° C. Then, the dried columns were calcined at 550° to 600° C. for 30 minutes to obtain columnar yellow lead monoxide. Then, the so obtained lead monoxide was dry-pulverized by an atomizer to obtain powdery lead monoxide having an orange color (H-8).

The so obtained lead monoxide (H-8) was tested according to the methods described in Comparative Example 1 to obtain results shown in Table 1.

Comparative Example 6

A method comprising introducing oxygen into water in which metallic lead granules are kept stationary to effect oxidation of lead is described in this Comparative Example.

Metallic lead granules having a size of 12 to 20 DIN prepared according to the method described in Comparative Example 1 were used as the starting metallic lead.

A grating plate was mounted in the lower portion of a vertical column of stainless steel having a diameter of 5 cm and a length of 50 cm, and the upper and bottom ends of the column were sealed with flanged lids so that the column could resist an inside pressure of at least 5 Kg/cm$^2$ gauge. Pipes were connected to the lids for introduction and discharge of gas and liquid.

5 Kg of the granular metallic lead was charged in the column and 100 cc of pure water was poured into the column, so that the metallic lead granules were stationary in water in the state where at least surfaces of the granules were wetted with water. Oxygen stored in an oxygen bomb was introduced into the column from the pipe inlet at the bottom of the column until the inside pressure was elevated to 2 Kg/cm$^2$. The inside temperature of the column was maintained at 25° C. and the granules were kept stationary for 24 hours, during which the inside pressure of the column was maintained at 2 Kg/cm$^2$ gauge.

Then, the inside pressure was released and the lids were taken off. Water was withdrawn from the column bottom, and 200 ml of water was poured into the column from the top thereof to wash the granules. The washing water was combined with the water withdrawn from the column after the experiment. The combined water was substantially transparent and the presence of lead monoxide as a reaction product was not substantially observed. However, surfaces of the metallic lead granules kept stationary had a dense orange color, and it was confirmed that very thin films of minium were formed on the surfaces of the granules.

The above combined water was tested according to the methods described in Comparative Example 1 to obtain results shown in Table 1.

Table 1

| Item | H-1 | H-2 | H-3 | H-4 | H-5 | H-6 | H-7 | H-8 | H-9 |
|---|---|---|---|---|---|---|---|---|---|
| Amount (l) of liquid medium | 1 | 1 | — | — | — | — | — | — | 0.1 |
| Amount (kg) of granular metallic lead | 0.0207 | 0.0207 | — | — | — | — | 0.01 | — | 5 |
| Rotation Number (rpm) | 3270 | 3270 | — | — | — | — | — | — | — |
| Reaction temperature (° C.) | 25±0.5 | 25±0.5 | — | — | — | — | — | — | — |
| Reaction time (hr) | 24 | 1 | — | — | — | — | — | — | 24 |
| Oxygen pressure ($Kg/cm^2$ G) | air 2.5l/hr | 2 | — | — | — | — | — | — | 2 |
| Hue (dispersion) | whitish grey | whitish yellow | white | sharp scarlet | sharp yellow | yellow | orange | orange | — |
| Hue (powder) | whitish grey | whitish yellow | white | scarlet | yellow | orange | orange | orange | — |
| Amount (g/hr) of PbO formed | 0.0883 | 0.152 | — | — | — | — | — | — | 0 |
| Ka | 0.0064 | 0.00073 | — | — | — | — | — | — | — |
| Conversion (%) | 0.396 | 0.682 | — | — | — | — | — | — | 0 |
| Selectivity (%) | 52.1 | 60.2 | — | — | — | — | — | — | 0 |
| Average particle size ($\mu$) | 0.5–1 | 0.2–0.4 | 0.7–1.2 | 3–5 | 3–5 | 2–4 | 0.8–1.2 | 0.2–0.4 | — |
| Infrared absorption peaks | | | | | | | | | |
| 1400 cm$^{-1}$ | vs | vs | vs | — | wb | wb | vs | vs | — |
| 680 cm$^{-1}$ | vs | vs | vs | w | w | w | vs | vs | — |
| 1732 cm$^{-1}$ | s | s | — | — | — | — | wb | — | — |
| 1052 cm$^{-1}$ | vs | vs | w | — | — | — | — | — | — |
| 840 cm$^{-1}$ | wb | wb | vs | — | — | — | — | — | — |
| 490 cm$^{-1}$ | — | — | vs | s | s | s | — | s | — |
| Chromic anhydride reactivity (%) | 92.1 | 91.8 | 89.9 | 43.5 | 93.5 | 79.4 | 87.7 | 81.4 | — |
| Acetic acid-insoluble component content (%) | 0.29 | 0.61 | 0 | 0 | 0 | 5.3 | 0.05 | | — |
| Crystal form (X-ray diffractionmetry) | LMH w | LMH | T,M | L | M | M | L | M | — |
| Light resistance ($\Delta E$) | 36.1 | 32.3 | 37.8 | 10.7 | 39.8 | 32.4 | 11.3 | 29.9 | — |
| Hue stability | X | X | X | X | X | △ | O | △ | — |
| Heat stability (min) | 62.5 | 64.0 | 111 | 172 | 161 | 415 | 375 | 306 | — |
| Rust preventing effect | C | C | B | D | D | B | C | B | — |
| Hiding power | 22 | 22 | 39 | 16 | 37 | 14 | 39 | 53 | — |
| Density (g/cc) | 8.15 | 8.06 | 8.38 | 9.36 | 9.57 | 9.36 | 9.21 | 9.23 | — |

The lead monoxide of this invention and the process for the preparation thereof are now described in detail by reference to the following Examples.

EXAMPLE 1

The process for preparing lead monoxide in water directly from metallic lead according to the wet pulverizing method and the lead monoxide prepared by this process are illustrated in this Example.

In order to clarify the effects of this invention, a stainless steel rotary mill was chosen as the oxidation apparatus and the oxidation in water was carried out batchwise.

The rotary will was composed of stainless steel and having an inner diameter of 20 cm, a length of 19.1 cm and inner volume of about 6 l, and it was designed that it could resist the inner pressure of 5 Kg/cm$^2$ gauge. A manhole was formed on one mirror plate so that cleaning of the inside of the mill, charging of raw materials and withdrawal of the product could be performed through this manhole. A lid capable of resisting a pressure of 5 Kg/cm$^2$ gauge was mounted on this manhole and a stainless steel gas introduction pipe having an inner diameter of ½ inch was attached to the lid. A pressure gauge was set to the pipe. The rotary mill was placed on a rotary stand and connected to a motor. A non-stage transmission apparatus was attached to the motor so that the rotation number could be changed within a range of about 20 to about 160 rpm. Cooling water was showered to the outside of the rotary mill so that the rotary mill could be cooled and the inside temperature of the rotary mill could be controlled to a prescribed level.

A liquid cyclone was disposed to prevent finer granules of unreacted metallic lead from being incorporated into the resulting lead monoxide dispersion.

Metallic lead granules having a fresh metal surface and a particle size of 1 to 6 mm, which were prepared in the same manner as described in Comparative Example 1, were charged in the rotary mill. As the liquid medium was employed catalyst-free pure water (ion-exchanged water). The amount of the liquid medium, the amount of granular metallic lead and the rotation number of the rotary mill were as shown in Table 2. The reaction temperature was adjusted to 7° ± 1° C. by cooling the outside of the rotary mill by cooling water. Oxygen (O$_2$) stored in an oxygen bomb was introduced into the rotary mill so that the inside pressure was 2 Kg/cm$^2$ at the start of the reaction. The oxidation (rotation of the rotary mill) was continued for 60 minutes.

The dispersion as the reaction product was recovered from the rotary mill and passed through the liquid cyclone to separate unreacted finer granules of metallic lead. In this manner, 22 kinds of lead monoxide dispersions [(S-1) to (S-22)] were obtained.

With respect to each of these dispersions, the amount formed of lead monoxide, conversion, selectivity, hue, average particle size, chromic anhydride reactivity and acetic acid-insoluble component content were determined and evaluated according to the methods described in Comparative Example 1, to obtain results shown in Table 2.

Each dispersion was subjected to solid-liquid separation using a centrifugal separator to obtain a lead monoxide cake. The cake was dried at about 50° C. under reduced pressure to obtain powdery lead monoxide. With respect to each of the so obtained lead monoxide products, the density, the infrared absorption spectrum analysis, X-ray diffractiometry, light resistance ($\Delta E$) test, hue stability test, thermal stability test, rust preventing effect test and hiding power test were carried out according to the methods described in Comparative Example 1 to obtain results shown in Table 2.

Table 2

| Item | S-1 | S-2 | S-3 | S-4 | S-5 | S-6 | S-7 | S-8 | S-9 | S-10 | S-11 | S-12 | S-13 | S-14 | S-15 | S-16 | S-17 | S-18 | S-19 | S-20 | S-21 | S-22 |
|---|---|---|---|---|---|---|---|---|---|---|---|---|---|---|---|---|---|---|---|---|---|---|
| Amount (l) of liquid medium | 1.5 | 1.5 | 1.5 | 1.5 | 0.1 | 0.75 | 1.5 | 3.0 | 4.5 | 0.15 | 4.5 | 0.75 | 4.5 | 0.75 | 4.5 | 0.75 | 4.5 | 0.75 | 4.5 | 0.75 | 4.5 | 0.75 |
| Amount (Kg) of granular metallic lead | 2.5 | 5.0 | 7.5 | 10 | 5 | 5 | 5 | 5 | 5 | 1 | 5 | 5 | 5 | 5 | 5 | 5 | 5 | 5 | 5 | 5 | 5 | 5 |
| Rotation number (rpm) | 58 | 58 | 58 | 58 | 58 | 58 | 58 | 58 | 58 | 58 | 22 | 22 | 58 | 58 | 58 | 88 | 100 | 100 | 118 | 118 | 159 | 159 |
| Reaction temperature (°C) | 7 | 7.5 | 7 | 7.5 | 7.5 | 7 | 7.5 | 7 | 7 | 7.5 | 7.5 | 8 | 7 | 7 | 8 | 8 | 7.5 | 8 | 7 | 8 | 7.5 | 8 |
| Reaction time (min) | 30 | 30 | 30 | 30 | 30 | 30 | 30 | 30 | 30 | 30 | 30 | 30 | 30 | 30 | 30 | 30 | 30 | 30 | 30 | 30 | 30 | 30 |
| Oxygen pressure (Kg/cm², G) | 2 | 2 | 2 | 2 | 2 | 2 | 2 | 2 | 2 | 2 | 2 | 2 | 2 | 2 | 2 | 2 | 2 | 2 | 2 | 2 | 2 | 2 |
| Hue (dispersion) | whitish orange | whitish orange | orange | orange | orange | orange | whitish orange | whitish orange | whitish orange | orange | whitish orange | orange | whitish orange | orange | whitish orange | orange | whitish orange | whitish orange | whitish orange | whitish orange | whitish orange | orange |
| Hue (powder) | lemon | lemon | orange | orange | orange | orange | lemon | lemon | lemon | orange | lemon | orange | lemon | orange | lemon | orange | lemon | lemon | lemon | orange | lemon | orange |
| Amount (g/hr) of PbO formed | 34.50 | 58.50 | 96.30 | 118.8 | 111.34 | 73.5 | 58.50 | 54.60 | 24.30 | 18.86 | 21.60 | 66.60 | 24.30 | 73.50 | 27.00 | 80.10 | 36.00 | 105.06 | 41.50 | 117.00 | 40.50 | 71.26 |
| Ka | 0.137 | 0.233 | 0.384 | 0.473 | 0.452 | 0.293 | 0.233 | 0.217 | 0.097 | 0.075 | 0.086 | 0.265 | 0.097 | 0.293 | 0.108 | 0.319 | 0.143 | 0.418 | 0.165 | 0.466 | 0.161 | 0.284 |
| Conversion (%) | 1.281 | 1.086 | 1.192 | 1.103 | 2.067 | 1.364 | 1.086 | 1.013 | 0.4511 | 1.750 | 0.4010 | 1.236 | 0.4511 | 1.364 | 0.5012 | 1.487 | 0.6683 | 1.950 | 0.7705 | 2.172 | 0.7519 | 1.3223 |
| Selectivity (%) | 99.9 | 99.9 | 99.5 | 99.6 | 97.5 | 99.5 | 99.9 | 99.9 | 100 | 99.6 | 100 | 99.9 | 100 | 99.9 | 100 | 98.3 | 100 | 97.9 | 100 | 98.7 | 100 | 99.1 |
| Average particle size (μ) | 0.02 | 0.02 | 0.01 | 0.03 | 0.03 | 0.02 | 0.01 | 0.02 | 0.05 | 0.01 | 0.05 | 0.02 | 0.05 | 0.02 | 0.04 | 0.02 | 0.05 | 0.02 | 0.05 | 0.02 | 0.05 | 0.03 |
| Infrared absorption peaks 1400 cm⁻¹ | vs | vs | vs | vs | vs | vs | vs | vs | vs | vs | vs | vs | vs | vs | vs | vs | vs | vs | vs | vs | vs | vs |
| 680 cm⁻¹ | vs | vs | vs | vs | vs | vs | vs | vs | vs | vs | vs | vs | vs | vs | vs | vs | vs | vs | vs | vs | vs | vs |
| 1732 cm⁻¹ | — | — | — | — | — | — | — | — | — | — | — | — | — | — | — | — | — | — | — | — | — | — |
| 1052 cm⁻¹ | — | — | — | — | — | — | — | — | — | — | — | — | — | — | — | — | — | — | — | — | — | — |
| 840 cm⁻¹ | — | — | — | — | — | — | w | w | w | — | — | — | w | — | w | — | — | — | — | — | w | — |
| 490 cm⁻¹ | vs | vs | vs | vs | vs | vs | vs | vs | vs | vs | vs | vs | vs | vs | vs | vs | vs | vs | vs | vs | vs | vs |
| Chromic anhydride reactivity (%) | 98.8 | 98.9 | 99.1 | 98.2 | 98.3 | 98.9 | 99.9 | 99.9 | 99.1 | 96.8 | 95.9 | 96.3 | 98.9 | 97.3 | 98.9 | 97.8 | 98.9 | 99.4 | 98.9 | 99.1 | 95.9 | 96.6 |
| Acetic acid-insoluble component content (%) | 0 | 0 | 0 | 0 | 1.1 | 0.7 | 0 | 0 | 0 | 0.01 | 0 | 0.4 | 0 | 0 | 0 | 1.8 | 0 | 1.1 | 0 | 0.6 | 0 | 0.3 |
| Crystal | | | | | | | | | | | | | | | | | | | | | | |

Table 2-continued

| form (X-ray diffractiometry) | M | M | M | M | M | M | M>>W | M>>W | M>>W | M | M | M | M | M | M>L | L | L>M | L | L>M | L | L,M>>W | L,M |
|---|---|---|---|---|---|---|---|---|---|---|---|---|---|---|---|---|---|---|---|---|---|---|
| Light resistance (ΔE) | 19 | 18 | 14 | 14 | 14 | 15 | 18 | 17 | 19 | 9 | 11 | 8 | 18 | 11 | 20 | 17 | 18 | 13 | 16 | 9 | 19 | 9 |
| Hue stability | Δ | Δ | | | | | | | Δ | | | | Δ | | | | | | | | | |
| Heat stability (min) | 270 | 270 | 270 | 280 | 280 | 290 | 260 | 230 | 190 | 210 | 245 | 230 | 230 | 210 | 250 | 200 | 195 | 180 | 240 | 250 | 235 | 260 |
| Rust preventing effect | A | A | A | A | A | A | A | A | B | A | A | A | B | A | A | A | B | A | A | A | A | A |
| Hiding power | 90 | 85 | 110 | 105 | 100 | 105 | 110 | 110 | 105 | 105 | 110 | 100 | 105 | 115 | 88 | 85 | 110 | 125 | 100 | 140 | 110 | 150 |
| Density (g/cc) | 9.01 | 9.02 | 9.18 | 9.18 | 9.18 | 9.20 | 8.96 | 8.96 | 8.80 | 9.07 | 8.89 | 8.99 | 8.89 | 8.94 | 8.92 | 9.11 | 8.99 | 9.12 | 9.01 | 9.14 | 8.81 | 9.14 |

When results obtained in Comparative Examples 1 and 6 (shown in Table 1) are compared with results obtained in Example 1 (shown in Table 2), the following matters can be seen:

(I) As will be apparent from results obtained in Comparative Example 6, even when starting metallic lead granules are kept copresent with water and oxygen and the surfaces are wetted with water, if friction is not caused among the granules through films of the liquid medium but kept stationary, formation of lead monoxide is not observed in water as the liquid medium but minium having a dense orange color is formed on surfaces of the granules.

(II) As will be apparent from results obtained in Comparative Example 1, even when starting metallic lead granules are kept copresent with water and oxygen, if the granules are completely submerged in water, even under violent agitation the amount formed of lead monoxide is 0.0883 g/hr at highest and the conversion is as low as 0.396%. Further, in this case, the particle size of the resulting lead monoxide is relatively large.

(III) On the other hand, when direct oxidation of metallic lead is carried out in water in the presence of water under preferred wet pulverization conditions of this invention, as will be apparent from the results shown in Table 2, lead monoxide can be prepared at very high conversion and selectivity and it has properties quite different from those of known lead monoxides as prepared in Comparative Examples 2, 3, 4 and 5.

(IV) From the results obtained in Example 1 where the wet pulverization was conducted under various conditions, it will be understood that in order to obtain high quality lead monoxide at high conversion and selectivity, i.e., in a high yield, the following conditions are very important:

(1) Granular metallic lead (solid), water as liquid medium (liquid) and oxygen are charged in a rotary mill.

(2) Reaction conditions are chosen so that at least parts of the granules wetted with water are exposed to the gas phase. As preferred conditions for attaining this state, for example, the following conditions may be adopted. The relative amount of the liquid medium to the amount of the granules is reduced as in S-5, and the rotation number is adjusted, as in S-20, to a level as high as possible within such a range as the granules are not fixed stationarily to the inner wall of the rotary mill by the centrifugal force.

(3) The rotary mill is rotated under such conditions that the metallic lead granules undergo effectively mutual friction in water and an ultrathin film of lead monoxide formed on the granule surface is perpetually peeled and simultaneously, a fresh metal surface is formed.

(4) Ultrafine particles of lead monoxide formed by peeling of this ultrathin film are dispersed in the liquid medium to form a dispersion.

(5) The foregoing 4 conditions are simultaneously satisfied in the rotary mill and this state is countinuously maintained throughout the oxidation process.

(V) The lead monoxide formed according to this invention has an ultrafine particle size which is generally less than 1/10 of the particle sizes of lead monoxides prepared according to the known methods. Further, the lead monoxide of this invention has a lower density and shows characteristic absorption peaks at wave numbers of 1400 cm$^{-1}$ and 680 cm$^{-1}$ in the infrared absorption spectrum. Further, the lead monoxide of this invention has a high chromic anhydride reactivity and it is excellent over the known lead monoxides with respect to the light resistance to ultraviolet rays and the hue stability. Accordingly, the lead monoxide of this invention shows a high effect of stabilizing vinyl chloride resins and a high rust preventing effect to steel places and the like.

(VI) Further, though each of the conventional methods which have been worked on an industrial scale is a dry method, the process of this invention is a wet process using a liquid medium, and all the steps are carried out in the aqueous system and no powder is handled. Accordingly, formation of lead dusts polluting working environment is prevented. Thus, the process of this invention can be said to be an epoch-making lead monoxide-preparing method which solves completely problems of pollution heretofore involved in the preparation of lead monoxide.

(VII) From experiments, it has been confirmed that minium ($Pb_3O_4$) having a sharp orange color can be obtained by calcining litharge type or massicot type lead monoxides prepared in Example 1 at 450° to 500° C. in an oxygen atmosphere according to the known technique and this minium is very excellent as a rust preventing pigment.

EXAMPLE 2

The continuous process for preparing lead monoxide by direct oxidation of metallic lead in the presence of water and products obtained by this continuous process are described in this Example.

As the continuous lead monoxide preparing apparatus, a stainless steel rotary mill of the continuous wet pulverization type described below was employed. In this Example, though the liquid medium and gas were continuously fed, in view of the operation facility, the granular metallic lead was charged batchwise.

The rotary mill used was a stainless steel tube mill having an inner diameter of 34.5 cm, a length of 130 cm and an inner volume of about 120 liters, and it was designed so that it could resist a pressure of 10 Kg/cm$^2$ gauge. A manhole of the square shape having a side of about 20 cm was formed at the center of this tube mill for cleaning of the inside of the mill and supply of raw materials, and a lid capable of resisting a pressure of 10 Kg/cm$^2$ gauge was attached to this manhole. A stainless steel pipe having an inner diameter of ½ inch was connected to one end plate of the tube mill through a rocky joint as a liquid medium introduction opening, so that the liquid medium was fed under pressure into the tube mill by a diaphragm pump of 3 horse powers. Another stainless steel pipe having an inner diameter of ½ inch was connected to the other mirror plate of the tube mill through a rocky joint as a product slurry withdrawal opening. The top end of the withdrawal pipe was inserted in the tube mill so that it was positioned below the level of the liquid medium in the tube mill and the product slurry could be withdrawn from the inside of the tube mill by the action of the inside pressure. A stainless steel wire was disposed at in the tube mill at a point closer to the center of the tube mill than the position of the above top end of the withdrawal pipe. Cooling water was showered onto the outside of the tube mill so that the entire of the tube mill was cooled. A motor of 1 horse power was connected to the tube mill through gear wheels, and a non-stage transmission apparatus was disposed so that the rotation number of the tube mill could be changed within a range of 20 to 100 rpm.

A liquid cyclone was attached to the discharge opening of the tube mill so as to prevent unreacted finer granules of metallic lead from being incorporated into the discharged dispersion.

The above tube mill was charged with 200 Kg of metallic lead granules having a size of about 1 to about 6 mm, which were prepared according to the method described in Comparative Example 1, through the manhole formed at the center of the tube mill. An aqueous solution of acetic acid having a concentration indicated in Table 3 and maintained at a temperature indicated in Table 3, if necessary, by cooling was chosen as the liquid medium. Cooling water maintained at a prescribed temperature was showered on the outside of the tube mill so that the prescribed reaction temperature was maintained in the tube mill. In the first place, the tube mill was rotated at a rotation number of 50 rpm and 30 l of the above acetic acid solution was charged into the tube mill, so that the solid-liquid ratio of the granular metallic lead and the acetic acid solution was about 6.6. Then, the acetic acid solution was poured into the tube mill at a rate of 1 l/min and the dispersion in an amount corresponding to the amount of the thus poured acetic acid solution was discharged from the tube mill. Simultaneously, oxygen ($O_2$) stored in an oxygen bomb was charged into the tube mill so that an inside pressure (gauge) indicated in Table 3 was maintained in the tube mill, and feeding of oxygen was continued that the inside pressure was maintained at the above level during the oxidation reaction.

When the reaction was continued for 30 minutes, the amount of the dispersion recovered during this period, the PbO concentration and the amount recovered of lead monoxide were checked according to the following methods described in Comparative Example 1. Further, when the reaction was continued for 24 hours, the above checking was conducted with respect to the dispersion recovered during the last 1 hour, and it was found that results were not different from those obtained with respect to the dispersion recovered for the first 1 hour.

The so recovered lead monoxide dispersion was passed through a liquid cyclone to remove unreacted granules of metallic lead therefrom.

In the foregoing manner, 18 kinds of lead monoxide dispersions (S-23 to S-40) were prepared. With respect to each of the so formed dispersions, seven items were checked in the same manner as in Example 1. Then, the dispersions were subjected to solid-liquid separation using a centrifugal separator. The resulting cakes were dried under reduced pressure, and with respect to each of the resulting lead monoxide powders, eight items were checked in the same manner as in Example 1. Results of these checkings are shown in Table 3.

Table 3

| Item | S-23 | S-24 | S-25 | S-26 | S-27 | S-28 | S-29 | S-30 | S-31 | S-32 | S-33 | S-34 | S-35 | S-36 | S-37 | S-38 | S-39 | S-40 |
|---|---|---|---|---|---|---|---|---|---|---|---|---|---|---|---|---|---|---|
| Amount (l) of liquid medium | 30 | 30 | 30 | 30 | 30 | 30 | 30 | 30 | 30 | 30 | 30 | 30 | 30 | 30 | 30 | 30 | 30 | 30 |
| Amount (Kg) of granular metallic lead | 200 | 200 | 200 | 200 | 200 | 200 | 200 | 200 | 200 | 200 | 200 | 200 | 200 | 200 | 200 | 200 | 200 | 200 |
| Rotation number (rpm) | 50 | 50 | 50 | 50 | 50 | 50 | 50 | 50 | 50 | 50 | 50 | 50 | 50 | 50 | 50 | 50 | 50 | 50 |
| Reaction temperature (°C) | 2.8 | 25 | 35 | 4 | 7 | 9 | 6.5 | 6 | 5.5 | 6.5 | 13 | 24 | 34 | 3 | 25 | 35 | 3 | 35 |
| Reaction time (min) | 60 | 30 | 30 | 30 | 30 | 30 | 30 | 30 | 30 | 30 | 30 | 30 | 30 | 30 | 30 | 30 | 30 | 30 |
| Oxygen pressure (Kg/cm²G) | | 2 | 2 | 2 | 2 | 2 | 2 | 2 | 2 | 2 | 2 | 2 | 2 | 2 | 3 | 3 | 3 | 3 |
| Catalyst concentration (g/100 cc) | 0.15 | 0.15 | 0.15 | 0.0007 | 0.1 | 0.2 | 0.3 | 0.4 | 0.5 | 0.15 | 0.15 | 0.15 | 0.15 | 0.15 | 0.15 | 0.15 | 0.5 | 0.5 |
| Hue (dispersion) | white | whitish yellow | yellow | whitish yellow | whitish green | white | white | white | white | white | white | yellow | yellow | white | whitish yellow | yellow | white | whitish yellow |
| Hue (powder) | lemon | yellow | yellow | yellow | white | white | lemon | lemon | lemon | lemon | lemon | yellow | yellow | lemon | yellow | yellow | white | yellow |
| Amount (g/hr) of PbO formed | 2910 | 2408 | 1591 | 2651 | 2962 | 3582 | 2716 | 3843 | 3543 | 2793 | 2378 | 2100 | 1721 | 3022 | 2611 | 2149 | 1728 | 1025 |
| Ka | 0.579 | 0.479 | 0.317 | 0.528 | 0.589 | 0.713 | 0.541 | 0.765 | 0.706 | 0.556 | 0.474 | 0.418 | 0.343 | 0.451 | 0.389 | 0.321 | 0.258 | 0.153 |
| Conversion (%) | 1.351 | 1.118 | 0.739 | 1.231 | 1.375 | 1.663 | 1.261 | 1.784 | 1.645 | 1.297 | 1.104 | 0.975 | 0.799 | 1.403 | 1.212 | 0.998 | 0.802 | 0.476 |
| Selectivity (%) | 99.7 | 99.8 | 99.8 | 99.8 | 99.3 | 99.1 | 99.2 | 99.7 | 99.1 | 99.9 | 99.2 | 99.2 | 99.3 | 99.2 | 99.1 | 98.9 | 99.0 | 98.3 |
| Average particle size (μ) | 0.01 | 0.03 | 0.01 | 0.008 | 0.007 | 0.007 | 0.009 | 0.01 | 0.02 | 0.05 | 0.05 | 0.05 | 0.01 | 0.01 | 0.01 | 0.01 | 0.02 | 0.02 |
| Infrared absorption peaks | | | | | | | | | | | | | | | | | | |
| 1400 cm⁻¹ | vs | vs | vs | vs | vs | vs | vs | vs | vs | vs | vs | vs | vs | vs | vs | vs | vs | vs |
| 680 cm⁻¹ | vs | vs | vs | vs | vs | vs | vs | vs | vs | vs | vs | vs | vs | vs | vs | vs | vs | vs |
| 1732 cm⁻¹ | — | — | — | — | — | — | — | — | — | — | — | — | — | — | — | — | — | — |
| 1052 cm⁻¹ | — | — | — | — | — | — | — | — | — | — | — | — | — | — | — | — | — | — |
| 840 cm⁻¹ | s | s | — | w | w | w | s | s | w | w | s | s | s | w | s | s | w | w |
| 490 cm⁻¹ | vs | vs | vs | vs | vs | vs | vs | vs | vs | vs | vs | vs | vs | vs | vs | vs | vs | vs |
| Chromic anhydride reactivity (%) | 99.9 | 99.9 | 99.8 | 99.7 | 99.1 | 99.9 | 99.8 | 99.8 | 99.8 | 99.9 | 99.9 | 99.3 | 99.2 | 99.7 | 99.3 | 99.2 | 99.8 | 99.7 |
| Acetic acid-insoluble component content (%) | 0 | 0 | 0 | 0 | trace | 0 | 0 | 0 | 0 | 0 | 0 | 0 | trace | 0 | 0 | trace | 0 | 0 |
| Crystal form (X-ray diffractometry) | M | M | M | M | M | M,T | M | M | M | M | M | M | M | M | M | M | M,T | M |
| Light resistance (ΔE) | 27.1 | 26.2 | 19.0 | 18.8 | 23.6 | 22.2 | 18.3 | 21.1 | 27.3 | 28.4 | 19.8 | 11.1 | 22.4 | 19.7 | 22.2 | 21.3 | 19.0 | 17.0 |
| Hue stability | | | | | | | | | | | | | | | | | | |
| Heat stability (min) | 275 | 290 | 290 | 260 | 260 | 260 | 210 | 295 | 192 | 386 | 205 | 310 | 351 | 206 | 195 | 205 | 295 | 350 |
| Rust preventing effect | B | B | B | B | B | B | B | A | B | A | B | A | A | B | B | B | A | B |
| Hiding power | 105 | 120 | 120 | 108 | 130 | 120 | 88 | 105 | 120 | 135 | 140 | 145 | 128 | 110 | 88 | 145 | 128 | 120 |
| Density (g/cc) | 8.39 | 9.11 | 9.09 | 9.07 | 8.38 | 8.82 | 8.49 | 8.99 | 8.72 | 8.83 | 8.98 | 8.88 | 8.43 | 8.93 | 8.67 | 8.77 | 8.91 | 8.89 |

As will be apparent from the above results, lead monoxide can be prepared in a continuous manner according to the above continuous wet pulverization process and especially, when acetic acid is used as a catalyst at different concentrations, various litharge type lead monoxides differing in the hue, for example, white, whitish lemon and orange litharge type lead monoxides can be obtained in very high yields which are hardly influenced by the reaction temperature or the oxygen gas pressure. Further, these lead monoxides have a ultrafine particulate form and they have peculiar properties not possessed by any of known lead monoxides. Incidentally, it was found that when the concentration of acetic acid as the catalyst is too high, for example, 5% by volume or higher, agglomerates of the starting metallic lead granules are formed and good results cannot be obtained.

lyst and the concentration was changed as shown in Table 4. Other preparation conditions were the same as in Example 1.

In this manner, 11 kinds of the lead monoxide dispersions differing in the hue, for examples, dispersions having a white, light green, lemon or orange color, were obtained (S-41 to S-51). When the thus formed dispersions were allowed to stand still, lead monoxides formed by the reaction were sedimented. Then, the majority of the supernatant was removed and dehydration was conducted under reduced pressure by filtration. The resulting cake was dried at 110° C. Thus, 11 kinds of powdery lead monoxides were prepared.

The above dispersions and lead monoxide powders were tested according to the methods described in Comparative Example 1 to obtain results shown in Table 4.

Table 4

| Item | S-41 | S-42 | S-43 | S-44 | S-45 | S-46 | S-47 | S-48 | S-49 | S-50 | S-51 |
|---|---|---|---|---|---|---|---|---|---|---|---|
| Catalyst concentration (g/100 cc) | 0.01 | 0.05 | 0.05 | 0.1 | 0.1 | 0.1 | 0.1 | 0.1 | 0.5 | 0.5 | 0.5 |
| Oxygen pressure ($Kg/cm^2$ G) | 2 | 2 | 2 | 2 | 2 | 2 | 2 | 2 | 2 | 2 | 2 |
| Amount (l) of liquid medium | 1.5 | 1.5 | 1.5 | 1.5 | 1.5 | 1.5 | 1.5 | 1.5 | 1.5 | 1.5 | 1.5 |
| Amount (Kg) of granular metallic lead | 10 | 10 | 10 | 10 | 10 | 10 | 10 | 10 | 10 | 10 | 10 |
| Rotation number (rpm) | 58 | 58 | 58 | 58 | 58 | 58 | 58 | 58 | 58 | 58 | 58 |
| Reaction temperature (° C) | 6.5 | 7 | 15.2 | 6.5 | 15.4 | 19.8 | 32.5 | 44.5 | 6 | 32 | 41 |
| Reaction time (min) | 30 | 30 | 30 | 30 | 30 | 30 | 30 | 30 | 30 | 30 | 30 |
| Hue (dispersion) | whitish orange | whitish grey | whitish grey | whitish grey | whitish grey | whitish grey | whitish grey | orange | white | white | lemon |
| Hue (powder) | orange | white | white | white | white | white | white | orange | light yellowish white | white | orange |
| Amount (g/hr) of PbO formed | 258.6 | 301.9 | 281.9 | 172.3 | 165.2 | 150.6 | 152.9 | 174.3 | 180.2 | 121.0 | 116.1 |
| Ka | 1.029 | 1.202 | 1.123 | 0.688 | 0.658 | 0.599 | 0.609 | 0.694 | 0.718 | 0.482 | 0.462 |
| Conversion (%) | 2.401 | 2.803 | 2.617 | 1.600 | 1.534 | 1.398 | 1.420 | 1.618 | 1.673 | 1.123 | 1.078 |
| Selectivity (%) | 100 | 100 | 100 | 100 | 99.9 | 99.8 | 99.8 | 99.6 | 100 | 100 | 100 |
| Average particle size($\mu$) | 0.01 | 0.01 | 0.01 | 0.02 | 0.02 | 0.02 | 0.02 | 0.02 | 0.03 | 0.03 | 0.03 |
| Infrared absorption peaks | | | | | | | | | | | |
| 1400 $cm^{-1}$ | vs | vs | vs | vs | vs | vs | vs | vs | vs | vs | vs |
| 680 $cm^{-1}$ | sb | sb | s | vs | s | s | s | s | — | — | — |
| 1732 $cm^{-1}$ | — | wb | wb | wb | wb | wb | wb | — | — | — | — |
| 1052 $cm^{-1}$ | — | — | — | — | — | — | — | — | — | — | — |
| 840 $cm^{-1}$ | — | — | — | — | — | — | s | s | — | — | — |
| 490 $cm^{-1}$ | s | — | — | — | s | s | — | — | — | — | — |
| Chromic anhydride reactivity (%) | 99.9 | 100 | 99.9 | 99.7 | 99.8 | 99.8 | 99.7 | 98.1 | 98.9 | 99.2 | 97.3 |
| Acetic acid-insoluble component content (%) | 0 | 0 | 0 | 0 | 0 | 0 | trace | trace | 0 | 0 | 0 |
| Crystal form (X-ray diffractiometry) | R>>M | R>>M | R>>M | M | M>R | R>M | M>R w | R>M w | R>M | R, M | R |
| Light resistance (ΔE) | 7.8 | 25.1 | 19.3 | 25.4 | 30.3 | 25.6 | 25.3 | 14.2 | 7.2 | 8.1 | 7.9 |
| Hue stability | | | | | | | | | Δ | Δ | Δ |
| Heat stability (min) | 317 | 285 | 210 | 295 | 290 | 300 | 270 | 260 | 265 | 230 | 240 |
| Rust preventing effect | A | A | B | A | B | B | A | A | B | B | B |
| Hiding power | 121 | 130 | 130 | 122 | 140 | 168 | 129 | 140 | 145 | 130 | 129 |
| Density (g/cc) | 9.08 | 9.07 | 9.07 | 8.94 | 8.92 | 9.03 | 9.04 | 9.01 | 9.08 | 8.98 | 9.11 |

EXAMPLE 3

In this Example, another embodiment of the wet pulverization process and lead monoxide prepared according to this embodiment are described.

Metallic lead granules having a size of about 1 to about 6 mm and a fresh metal face, which were prepared according to the method described in Comparative Example 1, were used as the starting lead granules.

An apparatus comprising the same tube mill of the wet pulverization type as described in Example 1 was used as the oxidation apparatus.

In the first place, 200 Kg of the granular metallic lead was charged into the tube mill, and the temperature was adjusted to a reaction temperature indicated in Table 4. Ammonium nitrate ($NH_4NO_3$) was chosen as the cata- As will be apparent from the above results, when ammonium nitrate is used as an oxidation catalyst in the continuous wet pulverization process, high quality lead monoxide can be effectively prepared directly from metallic lead granules in water. When the ammonium nitrate concentration is adjusted in the range of 0.1 to 5% by volume and the reaction temperature is maintained at a level lower than 32° C., lead monoxide having a white or light yellowish white color is obtained, whereas, if the concentration of ammonium nitrate is low, for example, 0.1% by volume or the reaction temperature is elevated, the resulting lead monoxide comes to have a yellow or orange color. In such lead monoxide having a yellow or orange color, however, the presence of lead peroxide is not quantitatively confirmed.

Various lead monoxide products differing in the hue are obtained depending on the catalyst concentration or the reaction temperature. However, each of them is composed of ultrafine particles formed from the surfaces of metallic lead granules when the metallic lead granules are turned in the rotary mill together with water as the liquid medium and oxygen, and they are similarly characterized by a low density, specific infrared absorption peaks and a high chromic anhydride reactivity.

EXAMPLE 4

Another embodiment in which lead monoxide is directly prepared from metallic lead granules in water and lead monoxide prepared in this embodiment are described in this Example.

Metallic lead granules having a particle size of about 1 to about 6 mm, which had been prepared according to the method described in Comparative Example 1 and allowed to stand still in air for one month, and larger granules formed by shaping the above granules into columns having a diameter of 10 mm and a height of 7 to 8 mm were used as starting metallic lead granules.

An oxidation apparatus comprising the same tube mill as described in Example 2 was used for the oxidation reaction. The rotary tube was charged with 200 g of the granules. As the liquid medium, water was chosen, and a catalyst selected from nitric acid ($HNO_3$), acetic acid ($CH_3COOH$), formic acid (HCOOH), tartaric acid [$(CH(OH)COOH)_2$], ammonia ($NH_4OH$), sodium hydroxide (NaOH), triethanol amine [$(HOCH_2CH_2)_3$] and ammonium nitrate ($CH_3COONH_4$) was incorporated in water at a concentration (g/100 ml) shown in Table 5. Oxygen gas was charged in the tube mill so that the inside pressure was elevated to 2 $Kg/cm^2$ and feeding of oxygen was continued during the reaction so that the inside pressure was maintained at 2 $Kg/cm^2$. The solid-liquid ratio of the granular metallic lead and the liquid medium was adjusted as shown in Table 5. Each of the feed rate of the liquid medium and the withdrawal rate of the dispersion was controlled to 1 l/min. The temperature of the liquid medium to be charged into the tube mill was controlled to 5° ± 1° C. and the outside of the tube mill was cooled by cooling water so that the inside temperature was maintained at 5° ± 1° C. The rotation number of the tube mill was controlled to 50 rpm. When the oxidation reaction was conducted in the above-mentioned continuous manner for 60 minutes, the amount of the dispersion recovered for these 60 minutes, the PbO concentration in the dispersion and the amount formed of lead monoxide were checked according to the methods described in Comparative Example 1.

The recovered dispersion was passed through the liquid cyclone to remove unreacted metallic lead granules and the like therefrom.

In the foregoing manner, 16 kinds of lead monoxide dispersions (S-50 to S-65) were prepared. Checking was conducted on each of the so recovered dispersions according to the methods described in Comparative Example 1. Then, each dispersion was subjected to solid-liquid separation using a centrifugal separator, and the resulting lead monoxide cake was dried at 50° C. under reduced pressure to obtain powdery lead monoxide.

Checking was conducted on each of the so recovered powdery lead monoxide products according to the methods described in Comparative Example 1.

Results of these checkings are shown in Table 5.

Table 5

| Item | S-52 | S-53 | S-54 | S-55 | S-56 | S-57 | S-58 | S-59 | S-60 | S-61 | S-62 | S-63 | S-64 | S-65 | S-66 | S-67 |
|---|---|---|---|---|---|---|---|---|---|---|---|---|---|---|---|---|
| Amount (l) of liquid medium | 20 | 30 | 30 | 20 | 30 | 30 | 20 | 30 | 30 | 30 | 30 | 30 | 30 | 30 | 30 | 30 |
| Amount (Kg) of granular metallic lead | 200 | 200 | 100 | 200 | 200 | 100 | 200 | 100 | 200 | 200 | 200 | 200 | 100 | 200 | 200 | 200 |
| Rotation number (rpm) | 50 | 50 | 50 | 50 | 50 | 50 | 50 | 50 | 50 | 50 | 50 | 50 | 50 | 50 | 50 | 50 |
| Reaction temperature (°C) | 5.1 | 6.3 | 4.9 | 4.0 | 5.1 | 6 | 5.5 | 5.2 | 5.0 | 5.7 | 5.2 | 5.1 | 4.9 | 4.8 | 5.1 | 4.9 |
| Reaction time (min) | 60 | 60 | 60 | 60 | 60 | 60 | 30 | 30 | 30 | 30 | 30 | 30 | 30 | 30 | 30 | 30 |
| Oxygen pressure (Kg/cm²G) | 2 | 2 | 2 | 2 | 2 | 2 | 2 | 2 | 2 | 2 | 2 | 2 | 2 | 2 | 2 | 2 |
| Kind and concentration (g/100 cc) of catalyst | nitric acetic acid, 0.01 | nitric acid, 0.03 | nitric acid, 0.05 | nitric acid, 0.015 | nitric acid, 0.015 | nitric acid, 0.015 | acetic acid, 0.15 | acetic acid, 0.15 | formic acid, 0.015 | tartaric acid, 0.015 | ammonia 0.01 | ammonia 0.01 | ammonia 0.01 | sodium hydroxide 0.01 | triethanolamine 0.01 | ammonium acetate 0.02 |
| Size of granular metallic lead | small | small | small | large | large | large | small | small | small | small | small | small | small | small | small | small |
| Hue (dispersion) | orange | orange | orange | orange | orange | orange | white | white | white | white | orange | orange | orange | orange | orange | orange |
| Hue (powder) | orange | orange | orange | orange | orange | orange | lemon | lemon | lemon | lemon | orange | orange | orange | orange | orange | orange |
| Amount (g/hr) of PbO formed | 8034.4 | 4782.0 | 4588.0 | 9434.5 | 7625.2 | 5298.8 | 2821.7 | 2283.2 | 9025.2 | 4674.2 | 9326.8 | 7775.9 | 6720.5 | 4480.3 | 1766.3 | 7862.1 |
| Ka | 1.599 | 0.952 | 0.914 | 1.878 | 1.518 | 1.055 | 0.562 | 0.455 | 1.797 | 0.931 | 1.857 | 1.548 | 1.338 | 0.892 | 0.352 | 1.566 |
| Conversion (%) | 3.73 | 2.22 | 2.13 | 4.38 | 3.54 | 2.46 | 1.31 | 1.06 | 4.19 | 2.17 | 4.33 | 3.61 | 3.12 | 2.08 | 0.82 | 3.65 |
| Selectivity (%) | 99.8 | 99.9 | 99.1 | 97.8 | 98.1 | 97.9 | 99.9 | 99.9 | 99.8 | 98.2 | 99.1 | 99.1 | 99.3 | 98.3 | 99.4 | 98.9 |
| Average particle size (μ) | 0.02 | 0.02 | 0.04 | 0.04 | 0.03 | 0.03 | 0.01 | 0.02 | 0.05 | 0.03 | 0.05 | 0.05 | 0.05 | 0.05 | 0.04 | 0.03 |
| Infrared absorption peaks | | | | | | | | | | | | | | | | |
| 1400 cm⁻¹ | vs | vs | vs | vs | vs | vs | vs | vs | vs | vs | vs | vs | vs | vs | vs | vs |
| 680 cm⁻¹ | vs | vs | vs | vs | vs | vs | vs | vs | vs | vs | vs | vs | vs | vs | vs | vs |
| 1732 cm⁻¹ | — | — | — | — | — | — | — | — | — | — | — | — | — | — | — | — |
| 1052 cm⁻¹ | — | — | — | — | — | — | — | — | — | — | — | — | — | — | — | — |
| 840 cm⁻¹ | s | s | s | s | — | — | s | s | w | — | — | — | — | — | — | — |
| 490 cm⁻¹ | vs | vs | vs | vs | — | — | vs | vs | ww | w | vs | vs | vs | vs | w | w |
| Chromic anhydride reactivity (%) | 99.1 | 97.1 | 97.7 | 98.2 | 99.1 | 99.4 | 99.9 | 99.7 | 96.1 | 97.2 | 96.8 | 96.8 | 96.7 | 95.9 | 95.8 | 98.9 |
| Acetic acid-insoluble component content (%) | 0 | 0 | 0.2 | 0.1 | 0 | 0.1 | 0 | 0 | 0 | 0.1 | 0 | 0 | c | 0.3 | 0 | 0 |
| Crystal form (X-ray diffractiometry) | L,M | L,M | M,L | L,M | M,L | M,L | M,T | M,T | M | M | M,T | M,T | M,T | M,T | L,M | M,T |
| Light resistance (ΔE) | 11.9 | 10.1 | 8.9 | 8.6 | 9.6 | 9.1 | 14 | 12 | 24 | 21 | 18 | 17 | 17 | 15 | 9 | 12 |
| Hue stability | 195 | 210 | 220 | 210 | 200 | 205 | 320 | 310 | 180 | 165 | 270 | 275 | 260 | 210 | 325 | 280 |
| Heat stability (min) | A | A | B | B | B | B | A | A | B | B | A | A | A | B | B | B |
| Rust preventing effect | 68 | 87 | 69 | 72 | 79 | 68 | 115 | 123 | 42 | 63 | 68 | 75 | 68 | 57 | 102 | 68 |
| Hiding power | | | | | | | | | | | | | | | | |
| Density (g/cc) | 9.20 | 9.18 | 9.17 | 8.97 | 9.06 | 9.01 | 8.38 | 8.38 | 7.36 | 7.84 | 8.10 | 8.12 | 8.13 | 7.95 | 8.32 | 8.11 |

From the above results, it will readily be understood that according to the continuous wet pulverization process of this invention lead monoxide can be prepared very effectively from metallic lead granules in water in the presence of various catalysts and even if surfaces of the starting granules are corroded more or less by air or the particle size is different to some extent, high quality lead monoxide can be obtained in very high yields. It will also be apparent than the yield of lead monoxide is enhanced as the solid/liquid ratio of the starting granular metallic lead and the liquid medium is increased.

It will readily be understood that each of lead monoxides prepared according to the embodiment illustrated in this Example is composed of ultrafine particles and it has peculiar properties not possessed by known lead monoxides at all.

As will be apparent to those skilled in the art, the kind of the catalyst to be used must be selected approximately depending on the intended use of lead monoxide. For example, when it is intended to use lead monoxide as a stabilizer for a vinyl chloride resin, the presence of nitrate ions or sodium ions at a concentration of an order of ppm in the lead monoxide product is not prepared, and when it is intended to use the lead monoxide as a raw material for the synthesis of lead stearate or basic lead sulfate, it is preferred that nitric acid or ammonium acetate be used as the catalyst.

What we claim is:

1. A process for the preparation of lead monoxide which comprises charging granules of metallic lead, a liquid medium and oxygen in a rotary mill, rotating the rotary mill under such conditions that at least parts of the metallic lead granules wetted with the liquid medium are located in the gas phase above the level of the liquid medium and friction is caused among the metallic granules through the liquid medium, to thereby form a dispersion of very fine particles of lead monoxide in the liquid medium, and separating the dispersion from the metallic lead granules.

2. A process according to claim 1 wherein the milling treatment is conducted under such conditions that the oxygen absorption speed constant [Ka, g.hr$^{-1}$.l$^{-1}$.(Kg/cm$^2$)$^{-1}$] defined by the following formula:

$$Ka = Uo/(P_1 \times Vo)$$

in which $Uo$ is an amount (g/hr) of oxygen consumed per unit time calculated from the amount of lead monoxide formed per unit time (hr), $Vo$ is an inner volume (l) of the rotary mill, and $P_1$ is a partial pressure (Kg/cm$^2$ absolute) of oxygen in the gas phase in the rotary mill, is at least 0.05.

3. A process according to claim 1 wherein the gas-liquid ratio ($R_{GL}$) defined by the following formula:

$$R_{GL} = V_2/V_1$$

in which $V_1$ is a volume (l) of the liquid medium in the rotary mill and $V_2$ is a volume (l) of the space of the gas phase oxygen, is at least 0.05.

4. A process according to claim 1 wherein the packed volume ratio Rv defined by the following formula:

$$Rv = B/Vo$$

in which $B$ is a bulk volume of metallic lead granules packed in the rotary mill and $Vo$ is an inner volume of the rotary mill, is within a range of from 0.05 to 0.4.

5. A process according to claim 1 wherein the rotary mill is rotated at a rotation number corresponding to 20 to 150% of the critical rotation number ($N_C$, rpm) defined by the following formula:

$$N_C = 42.27/\sqrt{D}$$

in which $D$ denotes an inner diameter (m) of the rotary mill.

6. A process according to claim 1 wherein the metallic lead granules are substantially spherical granules having an average size of 0.5 to 7 mm.

7. A process according to claim 1 wherein the liquid medium is a polar organic solvent or a non-polar organic solvent.

8. A process according to claim 1 wherein the liquid medium is an aqueous medium.

9. A process according to claim 1 wherein oxygen or an oxygen-containing gas is charged into the rotary mill under a pressure of at least 0.2 Kg/cm$^2$ (absolute).

10. A process according to claim 1 wherein the temperature of the liquid medium in the rotary mill is maintained in the range of from −5° to 70° C.

11. A process according to claim 1 wherein the residence time of the liquid medium in the rotary mill is adjusted to 0.5 to 120 minutes.

12. A process according to claim 1 wherein the dispersion of lead monoxide is withdrawn from the rotary mill at a solid concentration of 0.1 to 35 g/100 cc.

13. A process according to claim 1 wherein an acid, a base or a salt thereof is added to the recovered dispersion of lead monoxide to cause flocculation and sedimentation of ultrafine particles of lead monoxide.

14. A process according to claim 1 wherein the liquid medium is an aqueous medium containing an acid, a base or a salt thereof as a catalyst.

15. A process according to claim 14 wherein the catalyst is contained in the aqueous medium at a concentration of 5 × 10$^{-4}$ to 5 g/100 cc of the liquid medium.

16. A process according to claim 1 wherein the metallic lead granules, the liquid medium and oxygen are charged, and then, oxygen and the liquid medium are fed intermittently or continuously while a slurry containing ultrafine particles of lead monoxide is withdrawn intermittently or continuously.

17. A process according to claim 16 wherein the metallic lead granules are fed into the rotary mill intermittently or continuously.

18. A process according to claim 1 wherein the metallic lead granules, the liquid medium and oxygen are charged into the rotary mill, and then the rotary mill is sealed and the reaction is conducted batchwise.

19. A process according to claim 18 wherein the reaction is conducted while feeding oxygen into the reaction system intermittently or continuously.

20. A process according to claim 1 wherein the solid-liquid ratio ($R_{SL}$) defined by the following formula:

$$R_{SL} = W/V_1$$

wherein $V_1$ is a volume (l) of the liquid medium in the rotary mill and $W$ is an amount (Kg) of granular metallic lead in the rotary mill, is within a range of from 1 to 100 Kg/l.

21. A process according to claim 20 wherein the gas-liquid ratio ($R_{GL}$) defined by the following formula:

$$R_{GL} = V_2/V_1$$

in which $V_1$ is a volume (l) of the liquid medium in the rotary mill, $V_2$ is a volume (l) of the space of the gas phase oxygen,
is from 0.05 to 120;
the packed volume ratio Rv defined by the following formula:

$$Rv = B/Vo$$

in which $B$ is a bulk volume of metallic lead granules packed in the rotary mill and $Vo$ is an inner volume of the rotary mill,
is within a range of from 0.05 to 0.4;
and the rotary mill is rotated at a rotation number corresponding to 20 to 150% of the critical rotation number ($N_C$, rpm) defined by the following formula:

$$N_C = 42.27/\sqrt{D}$$

in which $D$ denotes an inner diameter (m) of the rotary mill.

22. A process according to claim 21 wherein the milling treatment is conducted under such conditions that the oxygen absorption speed constant Ka (g.hr$^{-1}$.l$^{-1}$.(Kg/cm$^2$)$^{-1}$) defined by the following formula:

$$Ka = Uo/(P_1 \times Vo)$$

in which $Uo$ is an amount (g/hr) of oxygen consumed per unit time calculated from the amount of lead monoxide formed per unit time (hr), $Vo$ is an inner volume (l) of the rotary mill, and $P_1$ is a partial pressure (Kg/cm$^2$ absolute) of oxygen in the gas phase in the rotary mill,
is at least 0.05.

23. A process according to claim 22 wherein the metallic lead granules are substantially spherical granules having an average size of 0.5 to 7 mm.

24. A process for the preparation of lead monoxide which comprises,
charging granules of metallic lead, a liquid medium and oxygen in a rotary mill to form a liquid phase and a gas phase above said liquid phase,
wetting the metallic lead granules with said liquid medium,
rotating the rotary mill to cause at least parts of the wetted metallic lead granules to enter the gas phase above said liquid phase for a period of time sufficient to allow the liquid medium which is exposed to said gas phase to absorb oxygen gas present in said gas phase whereby the surfaces of the wetted metallic lead granules are oxidized to lead monoxide,
creating friction between the metallic lead granules having lead monoxide surfaces through the liquid medium to thereby form a dispersion of very fine particles of lead monoxide in the liquid medium, and
separating the dispersion from the metallic lead granules.

25. A lead monoxide having a true density of 8.3 to 9.2 g/cc, an average particle size not larger than 0.2 μ, an infrared absorption peak at a wave number of 1400 to 1410 cm$^{-1}$ and a chromic anhydride reactivity (RC) of at least 94%, said chromic anhydride reactivity (RC) being defined by the following formula:

$$RC(\%) = AC/TC \times 100$$

wherein $AC$ denotes the quantitative analysis value (g) of $CrO_3$ in a product (lead chromate) obtained by reacting lead monoxide with chromic anhydride at a molar ratio of 1 : 1 in water in the absence of a catalyst and $TC$ denotes a theoretical value (g) of $CrO_3$ to be contained in the product, namely the amount of chromic anhydride added.

26. A lead monoxide according to claim 25 which has X-ray diffraction peaks substantially corresponding to the following X-ray diffraction pattern:

| Lattice Spacing d (Å) | Relative Intensity (I/Io) |
| --- | --- |
| 5.03 | 7.2 |
| 3.11 | 100 |
| 2.81 | 38.6 |
| 2.51 | 20.5 |
| 1.98 | 29.8 |
| 1.67 | 25.5 |
| 1.55 | 10.0 |
| 1.54 | 14.2 | and which has a true density of 8.80 to 9.17 g/cc, an average particle size of 0.01 to 0.05 μ and a hue of an orange-to-lemon color.

27. A lead monoxide according to claim 25 which has X-ray diffraction peaks substantially corresponding to the following X-ray diffraction pattern:

| Lattice Spacing d (Å) | Relative Intensity (I/Io) |
| --- | --- |
| 3.07 | 30.5 |
| 2.95 | 100 |
| 2.74 | 7.4 |
| 2.38 | 5.2 | and which has a true density of 8.35 to 9.2 g/cc, an average particle size of 0.01 to 0.05 μ and a hue of a white-to-yellow color.

28. A lead monoxide according to claim 25 which has X-ray diffraction peaks substantially corresponding to the following X-ray diffraction pattern:

| Lattice Spacing d (Å) | Relative Intensity (I/Io) |
| --- | --- |
| 3.62 | 100 |
| 3.38 | 34.6 |
| 3.14 | 11.6 |
| 3.05 | 74.3 |
| 2.95 | 11.6 |
| 2.91 | 17.1 |
| 2.86 | 75.6 |
| 2.55 | 34.9 |
| 2.46 | 21.1 |
| 2.33 | 20.4 | and which has a true density of 8.80 to 9.1 g/cc, an average particle size of 0.01 to 0.05 μ, a hydrate water content of 0.2 to 0.8 mole per mole of PbO and a hue of a white color.

* * * * *

UNITED STATES PATENT AND TRADEMARK OFFICE
CERTIFICATE OF CORRECTION

PATENT NO. : 4,117,104
DATED : September 26, 1978
INVENTOR(S) : Yujiro Sugahara, et al.

It is certified that error appears in the above-identified patent and that said Letters Patent are hereby corrected as shown below:

The date the application was filed should be changed to read as follows -- May 3, 1977--

Signed and Sealed this

Twenty-third Day of January 1979

[SEAL]

Attest:

RUTH C. MASON
Attesting Officer

DONALD W. BANNER
Commissioner of Patents and Trademarks